US009015511B2

(12) United States Patent
Kardach et al.

(10) Patent No.: US 9,015,511 B2
(45) Date of Patent: Apr. 21, 2015

(54) NON MAIN CPU/OS BASED OPERATIONAL ENVIRONMENT

(71) Applicant: Intel Corporation, Santa Clara, CA (US)

(72) Inventors: James P. Kardach, Saratoga, CA (US); Brian V. Belmont, Portland, OR (US); Muthu K. Kumar, Hillsboro, OR (US); Riley W. Jackson, Portland, OR (US); Gunner D. Danneels, Beaverton, OR (US); Richard A. Forand, Portland, OR (US); Vivek Gupta, Portland, OR (US); Jeffrey L. Huckins, Hillsboro, OR (US); Kristoffer D. Fleming, Chandler, AZ (US); Uma M. Gadamsetty, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/010,852

(22) Filed: Aug. 27, 2013

(65) Prior Publication Data
US 2013/0346664 A1 Dec. 26, 2013

Related U.S. Application Data

(60) Continuation of application No. 13/454,993, filed on Apr. 24, 2012, now Pat. No. 8,522,063, which is a continuation of application No. 12/235,473, filed on Sep. 22, 2008, now Pat. No. 8,166,325, which is a
(Continued)

(51) Int. Cl.
*G06F 12/00* (2006.01)
*G06F 13/40* (2006.01)
(Continued)

(52) U.S. Cl.
CPC .......... *G06F 13/4072* (2013.01); *G06F 1/3203* (2013.01); *G06F 1/3293* (2013.01); *Y02B 60/121* (2013.01); *Y02B 60/32* (2013.01)

(58) Field of Classification Search
CPC .................................. G06F 12/00; G06F 7/00
USPC ............................................. 713/323; 710/15
See application file for complete search history.

(56) References Cited

U.S. PATENT DOCUMENTS 5,432,462 A    7/1995 Obregon et al.
5,446,906 A    8/1995 Kardach et al.
(Continued)

FOREIGN PATENT DOCUMENTS

DE    10023163 A1    11/2001
EP    0810510 A1    3/1997
(Continued)

OTHER PUBLICATIONS

"Advanced Configuration and Power Interface Specification", Compaq/Intel/Microsoft/Phoenix and Toshiba, Revision 2.0a, Mar. 31, 2002, Relevant Sections 2.2-2.6 (pp. 219-224), 3.2-3.4.4 (pp. 27-32), 4.3 (pp. 50-54) and 4.7.2.3 (pp. 67).
(Continued)

*Primary Examiner* — Christopher Shin
(74) *Attorney, Agent, or Firm* — Jordan IP Law, LLC

(57) ABSTRACT

A computing system is described that includes a main system bus that remains active while said computing system operates within a non main CPU/OS based operational state. The computing system also includes a controller that operates functional tasks while the computing system is within the non main CPU/OS based operational state. The computing system also includes an I/O unit coupled to the main system bus that remains active while the computing system operates within the non main CPU/OS based operational state.

19 Claims, 13 Drawing Sheets

Related U.S. Application Data continuation of application No. 11/435,264, filed on May 15, 2006, now Pat. No. 7,428,650, which is a division of application No. 10/367,566, filed on Feb. 14, 2003, now Pat. No. 7,080,271.

(51) Int. Cl.
  *G06F 1/32* (2006.01)
  *G06F 7/00* (2006.01)

(56) References Cited

U.S. PATENT DOCUMENTS

| | | | |
|---|---|---|---|
| 5,465,367 A | | 11/1995 | Reddy et al. |
| 5,471,625 A | * | 11/1995 | Mussemann et al. ......... 713/322 |
| 5,515,539 A | | 5/1996 | Ohashi et al. |
| 5,560,001 A | | 9/1996 | Kardach et al. |
| 5,652,894 A | * | 7/1997 | Hu et al. ....................... 713/322 |
| 5,655,127 A | | 8/1997 | Rabe et al. |
| 5,657,483 A | | 8/1997 | Kardach et al. |
| 5,692,202 A | | 11/1997 | Kardach et al. |
| 5,842,028 A | * | 11/1998 | Vajapey ........................ 713/310 |
| 5,860,016 A | | 1/1999 | Nookala et al. |
| 5,884,088 A | | 3/1999 | Kardach et al. |
| 5,903,746 A | * | 5/1999 | Swoboda et al. ............. 713/501 |
| 5,936,442 A | | 8/1999 | Liu et al. |
| 5,959,833 A | | 9/1999 | Youens |
| 5,983,073 A | | 11/1999 | Ditzik |
| 5,983,186 A | | 11/1999 | Miyazawa et al. |
| 5,983,354 A | * | 11/1999 | Poisner et al. ................ 713/320 |
| 6,006,285 A | | 12/1999 | Jacobs et al. |
| 6,014,751 A | | 1/2000 | Kardach et al. |
| 6,052,792 A | | 4/2000 | Mensch, Jr. |
| 6,098,175 A | | 8/2000 | Lee |
| 6,125,450 A | | 9/2000 | Kardach |
| 6,131,166 A | | 10/2000 | Wong-Insley |
| 6,222,507 B1 | | 4/2001 | Gouko |
| 6,240,521 B1 | | 5/2001 | Barber et al. |
| 6,289,464 B1 | | 9/2001 | Wecker et al. |
| 6,341,354 B1 | | 1/2002 | Lee |
| 6,385,734 B2 | | 5/2002 | Atkinson |
| 6,412,075 B1 | | 6/2002 | Klein |
| 6,424,249 B1 | | 7/2002 | Houvener |
| 6,445,730 B1 | | 9/2002 | Greszczuk et al. |
| 6,502,003 B1 | | 12/2002 | Jacobs et al. |
| 6,535,985 B1 | | 3/2003 | Oshima et al. |
| 6,631,474 B1 | | 10/2003 | Cai et al. |
| 6,654,827 B2 | | 11/2003 | Zhang et al. |
| 6,658,576 B1 | | 12/2003 | Lee |
| 6,675,233 B1 | | 1/2004 | Du et al. |
| 6,680,738 B1 | | 1/2004 | Ishii et al. |
| 6,697,953 B1 | | 2/2004 | Collins |
| 6,725,060 B1 | | 4/2004 | Chhatriwala et al. |
| 6,751,742 B1 | | 6/2004 | Duhault et al. |
| 6,760,850 B1 | | 7/2004 | Atkinson et al. |
| 6,785,786 B1 | | 8/2004 | Gold et al. |
| 6,801,208 B2 | | 10/2004 | Keshava et al. |
| 6,801,974 B1 | | 10/2004 | Watts, Jr. et al. |
| 6,803,810 B2 | | 10/2004 | Yamada et al. |
| 6,804,791 B2 | | 10/2004 | Oshima et al. |
| 6,835,850 B2 | | 12/2004 | Drent et al. |
| 6,836,850 B2 | | 12/2004 | Cheng |
| 6,848,057 B2 | | 1/2005 | Hicok |
| 6,895,448 B2 | | 5/2005 | Chan et al. |
| 6,895,517 B2 | | 5/2005 | Wang |
| 6,920,573 B2 | | 7/2005 | Lee |
| 6,922,759 B1 | | 7/2005 | Garritsen |
| 7,003,682 B2 | | 2/2006 | Irazabal et al. |
| 7,058,829 B2 | | 6/2006 | Hamilton |
| 7,062,647 B2 | | 6/2006 | Nguyen et al. |
| 7,080,271 B2 | | 7/2006 | Kardach et al. |
| 7,093,149 B2 | | 8/2006 | Tsirkel et al. |
| 7,114,090 B2 | | 9/2006 | Kardach et al. |
| 7,117,379 B2 | | 10/2006 | Hamilton |
| 7,149,692 B1 | | 12/2006 | Wu |
| 7,254,730 B2 | | 8/2007 | Kardach et al. |
| 7,428,650 B2 | | 9/2008 | Kardach et al. |
| 7,975,161 B2 | | 7/2011 | Kahn |
| 8,150,477 B2 | * | 4/2012 | Cho et al. ....................... 455/574 |
| 8,166,325 B2 | | 4/2012 | Kardach et al. |
| 8,522,063 B2 | | 8/2013 | Kardach et al. |
| 2002/0023237 A1 | | 2/2002 | Yamada et al. |
| 2002/0068610 A1 | | 6/2002 | Anvekar et al. |
| 2002/0085835 A1 | | 7/2002 | Zhang et al. |
| 2002/0086719 A1 | | 7/2002 | Kedia et al. |
| 2002/0129288 A1 | | 9/2002 | Loh et al. |
| 2002/0173344 A1 | | 11/2002 | Cupps et al. |
| 2002/0178390 A1 | | 11/2002 | Lee |
| 2003/0041273 A1 | | 2/2003 | Wang |
| 2003/0115415 A1 | | 6/2003 | Want et al. |
| 2003/0126251 A1 | | 7/2003 | Chen et al. |
| 2003/0149903 A1 | | 8/2003 | Chang |
| 2003/0208550 A1 | | 11/2003 | Hamilton et al. |
| 2003/0208701 A1 | | 11/2003 | Watari et al. |
| 2003/0237012 A1 | | 12/2003 | Jahagirdar et al. |
| 2004/0034802 A1 | | 2/2004 | Hamilton |
| 2004/0034803 A1 | | 2/2004 | Hamilton |
| 2004/0073818 A1 | | 4/2004 | Cheok et al. |
| 2009/0019185 A1 | | 1/2009 | Kardach et al. |
| 2010/0250989 A1 | | 9/2010 | Hamilton |
| 2012/0210036 A1 | * | 8/2012 | Kardach et al. ............... 710/305 |

FOREIGN PATENT DOCUMENTS

| | | |
|---|---|---|
| EP | 0945778 A2 | 9/1999 |
| EP | 1221645 A2 | 7/2002 |
| EP | 1359494 A2 | 11/2003 |
| JP | 09-026832 A | 1/1997 |
| JP | 2000-231533 A | 8/2000 |
| JP | 2000-284858 A | 10/2000 |
| JP | 2001-325203 A | 11/2001 |
| JP | 2002073497 A | 3/2002 |
| WO | 01/15159 A1 | 3/2001 |
| WO | 01/61442 A1 | 8/2001 |
| WO | 01/61872 A2 | 8/2001 |
| WO | 02/080003 A2 | 10/2002 |
| WO | 2004/075034 A2 | 9/2004 |

OTHER PUBLICATIONS

Notice of Publication and Entering into Substantive Examination Procedure of Application of Patent for Invention for Counterpart China Patent Application No. 200480003945.3, mailed on Aug. 25, 2006, 4 pages including translation.
Letters Patent for Counterpart Korean Patent Application No. 10-2005-7014890, Patent No. 10-0747165, 3 pages including translation.
Office Action received for Chinese Patent Application No. 200480003945.3, mailed on Apr. 27, 2007, 6 pages together with English Translation.
Office Action received for German Patent Application No. 112004000166.8, mailed on Feb. 28, 2007, 9 pages of office action including 4 pages of English translation.
Examination Report received for Great Britain Patent Application No. GB0513567.8, mailed on Feb. 15, 2006 , 6 pages.
Statement of Relevance of DE10023163 Under 37 C.F.R. 1.98, 1 page.
International search report /written opinion received for PCT Patent Application No. PCT/US2004/000726, mailed on Jul. 11, 2005, 24 pages.
Office Action received for Chinese Patent Application No. 200480003945.3, mailed on Apr. 3, 2009, 6 pages of Chinese office action including 2 pages of English translation.
Office Action received for Chinese Patent Application No. 200480003945.3, mailed on Jun. 6, 2008, 5 pages of Chinese office action including 2 pages of English translation.
Office Action received for Chinese Patent Application No. 200480003945.3, mailed on Sep. 26, 2008, 6 pages of Chinese office action including 3 pages of English translation.
Office Action received for German Patent Application No. 112004000166.8, mailed on Sep. 16, 2010, 10 pages of German office action including 5 pages of English translation.

(56) References Cited

OTHER PUBLICATIONS

Office Action received for Korean Patent Application No. 10-2005-7014890, mailed on Sep. 21, 2006, 4 pages of Korean office action including 2 pages of English translation.
Examination Report received for United Kingdom Patent Application No. GB0513567.8, mailed on Sep. 23, 2005, 7 pages.
Office Action received for United Kingdom Patent Application No. GB0513567.8, mailed on Jun. 23, 2006, 1 page.
Notice of Allowance Received for U.S. Appl. No. 13/454,993, mailed on Apr. 25, 2013, 6 pages.
Office Action received for U.S. Appl. No. 10/367,566, mailed on Feb. 14, 2005, 13 pages.
Office Action received for U.S. Appl. No. 10/367,566, mailed on Aug. 15, 2005, 7 pages.
Notice of Allowance received for U.S. Appl. No. 10/367,566, mailed on Dec. 16, 2005, 4 pages.
Supplemental Notice of Allowance received for U.S. Appl. No. 10/367,566, mailed on May 24, 2006, 2 pages.
Office Action received for U.S. Appl. No. 11/435,264, mailed on May 31, 2007, 12 pages.
Notice of Allowance received for U.S. Appl. No. 11/435,264, mailed on Dec. 31, 2007, 6 pages.
Supplemental Notice of Allowance received for U.S. Appl. No. 11/435,264, mailed on May 16, 2008, 5 pages.
Notice of Allowance received for U.S. Appl. No. 12/235,473, mailed on Aug. 8, 2011, 8 pages.
Supplemental Notice of Allowance received for U.S. Appl. No. 12/235,473, mailed on Dec. 19, 2011, 7 pages.
Office Action received for U.S. Appl. No. 13/454,993, mailed on May 17, 2012, 8 pages.
Office Action received for U.S. Appl. No. 13/454,993, mailed on Oct. 22, 2012, 10 pages.
Requirement for Restriction/Election received for U.S. Appl. No. 12/235,473, mailed on Mar. 24, 2011, 6 pages.
International Preliminary Report on Patentability and Written Opinion received for PCT Application No. PCT/US2004/000726, issued on Aug. 19, 2005, 15 pages.

\* cited by examiner

NON MAIN CPU/OS BASED OPERATIONAL ENVIRONMENT

PRIORITY

This application is a continuation of and claims the priority date of U.S. application Ser. No. 12/235,473, filed Sep. 22, 2008, which is a continuation of U.S. application Ser. No. 11/435,264, filed May 15, 2006 and is now Issued U.S. Pat. No. 7,428,650, which is a divisional of U.S. application Ser. No. 10/367,566, filed Feb. 14, 2003, and is now Issued U.S. Pat. No. 7,080,271.

FIELD OF INVENTION

The field of invention relates generally to computing; and, more specifically, to a non main CPU/OS based operational environment.

BACKGROUND

A. Computing Systems

FIG. 1 shows an embodiment of a computing system 100. The computing system includes a Central Processing Unit (CPU) 101, a cache 102, memory and I/O control 103 and a system memory 104. Software instructions performed by the computing system (and its corresponding data) are stored in the system memory 104 and cache 102 (where frequently used instructions and data are stored in cache 102). The software instructions (together with corresponding data) are executed by the CPU 101. The memory controller portion of the memory and I/O control 103 is responsible for managing access to the system memory 104 (which may be used by functional elements other than the CPU 101 such as the graphics controller 105 and various I/O units).

The graphics controller 105 and display 106 provide the computer generated images observed by the user of the computing system 100. The I/O controller of the memory and I/O control function 103 is responsible for managing access to the system memory 104 (and/or CPU 101) for various I/O units $108_1$ through $108_N$ and 109, 111, 113 and 115. I/O units are typically viewed as functional units that send/receive information to/from the computing system (e.g., a networking adapter, a MODEM, a wireless interface, a keyboard, a mouse, etc.) and/or functional units used for storing the computing system's information within the computing system 100 (e.g., a hard disk drive unit).

Various I/O units are frequently found within a computing system; and, moreover, various types of interfaces for communication between an I/O unit and the I/O control function are frequently found within a computing system. Often, these interfaces are defined by an industry standard. The exemplary computing system architecture of FIG. 1 shows a system bus interface 107 into which different I/O units $108_1$ through $108_N$ may be plugged; and, different interfaces 110, 112, 114 and 116. Each of the different interfaces 110, 112, 114 and 116 is drawn in FIG. 1 as having its own corresponding I/O unit 109, 111, 113 and 115.

Note that a different number of interfaces may be entertained from computer system to computer system; and, different interface types (e.g., in terms of the maximum number of I/O units per interface, interfacing technique, etc.) may be entertained from computer system to computer system. As just one possible implementation, using the computing system of FIG. 1 as a template: 1) system bus 107 is a PCI bus; 2) interface 110 is a serial port; 3) interface 112 is a USB interface; 4) interface 114 is a serial interface; and 5) interface 116 is an IDE interface (or other storage device interface)

B. Computing System State Diagram

FIG. 2 shows a prior art state diagram for a computing system. An embodiment of the operating states observed in FIG. 2 may be found in the Advanced Configuration and Power Interface (ACPI) Specification, Revision 2.0a dated Mar. 31, 2002 (and published by Compaq Computer Corporation, Intel Corporation, Microsoft Corporation, Phoenix Technologies Ltd., and Toshiba Corporation). Although the ACPI specification is recognized as describing a large number of existing computing systems, it should be recognized that large numbers of computing systems that do not conform to the ACPI specification can still conform to the operating state configuration observed in FIG. 2. As such, the description of FIG. 1 corresponds to a more generic description that the ACPI specification conforms to.

According to the depiction of FIG. 2 a first state 201, referred to as the "normal on" state 201, is the normal operating state of the computer (i.e., the state of the computer when it is actively powered and is being (or is ready to be) used by a user). Within the ACPI specification, the "normal on" state 201 is referred to as the "G0" state. A second state 202 refers to any of one or more states where the computing system is recognized as being "off". The ACPI specification recognizes two such states: a hardware based off state (e.g., where power has been removed from the entire system) and a software based off state (where power is provided to the system but the BIOS and operating system (OS) have to be reloaded from scratch without reference to the stored context of a previously operating environment). The ACPI specification refers to the hardware based off state as the "G3" state and the software based off state as the "G2" state.

A third state 203 refers to any of one or more states where the computing system is recognized as "sleep". For sleep states, the operating environment of a system within the "normal on" state 201 (e.g., the state and data of various software routines) are saved prior to the CPU of the computer being entered into a lower power consumption state. The sleep state(s) 203 are aimed at saving power consumed by the CPU over a lull period in the continuous use of the computing system. That is, for example, if a user is using a computing system in the normal on state 201 (e.g., typing a document) and then becomes distracted so as to temporarily refrain from such use (e.g., to answer a telephone call)—the computing system can automatically transition from the normal on state 201 to a sleep state 202 to reduce system power consumption.

Here, the software operating environment of the computing system (e.g., including the document being written), which is also referred to as "context" or "the context", is saved beforehand. As a consequence, when the user returns to use the computing system after the distraction is complete, the computing system can automatically present the user with the environment that existed when the distraction arose (by recalling the saved context) as part of the transition back to the normal state 201 from the sleep state 203. The ACPI specification recognizes a collection of different sleep states (notably the "S1", "S2", "S3" and "S4" states) each having its own respective balance between power savings and delay when returning to the "normal on" state 201 (here, the S1, S2 and S3 states are recognized as being various flavors of "standby" and the S4 state is a "hibernate" state).

A problem with prior art sleep states, however, is that the CPU is unable to perform any useful work. As such, although power savings are recognized, any tasks that may have been useful to perform during the time period over which the computing system was sleep are impossible to implement.

BRIEF DESCRIPTION OF THE DRAWINGS

The invention may be best understood by referring to the following description and accompanying drawings that are used to illustrate embodiments of the invention. In the drawings.

DESCRIPTION

State Diagram and Computing System Having Operational Low Power States

In order for a computing system to perform useful tasks from within a low power consumption state, special states need to be designed into the system. In particular, these special states should be configured to have a sufficient amount of functional prowess so that one or more useful tasks can be executed; while, at the same time, consume power at a rate that is lower than those associated with the "normal on" state. Here, FIGS. 3 and 4a through 4c illustrate an embodiment of a computing system having two such special states.

Figure 3:
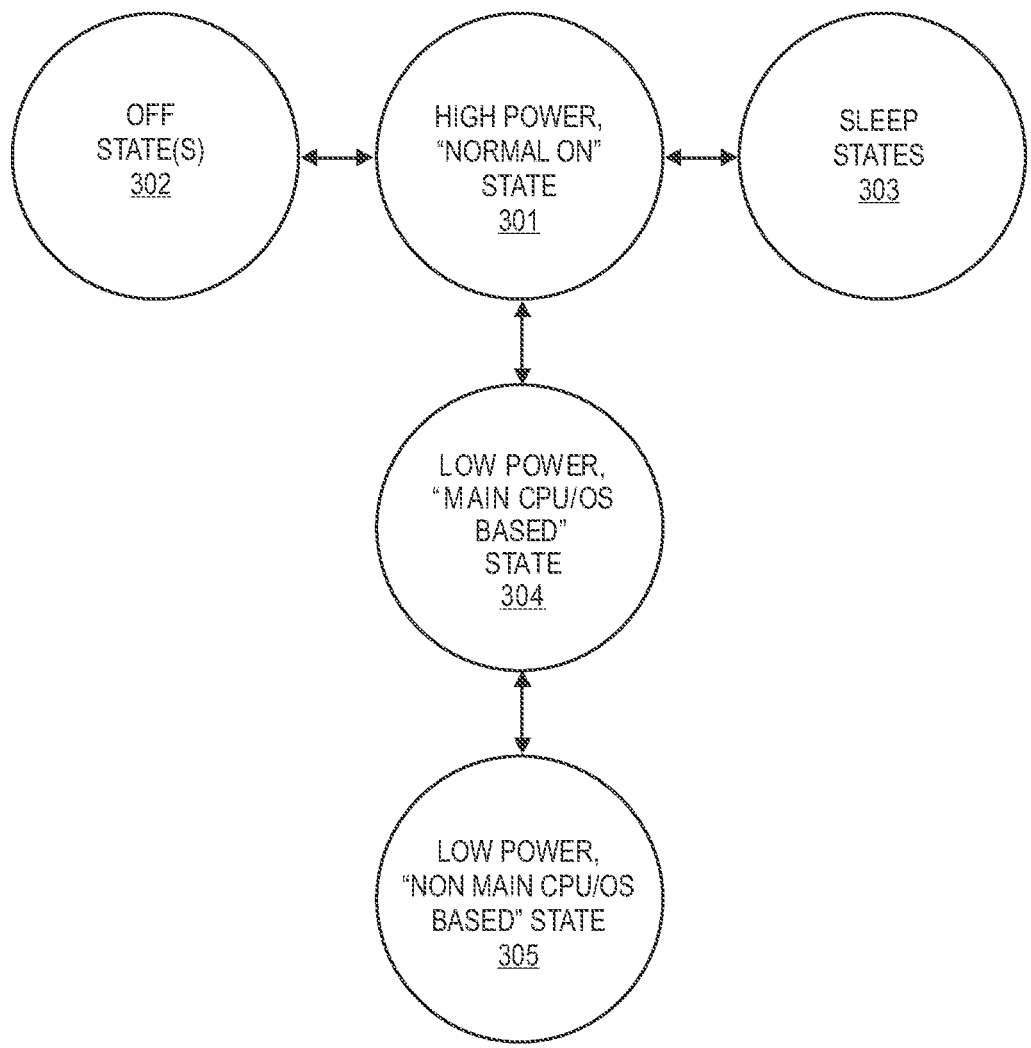
FIG. 3 shows an improved state diagram for a computing system having useful low power states.
Figure 4A:
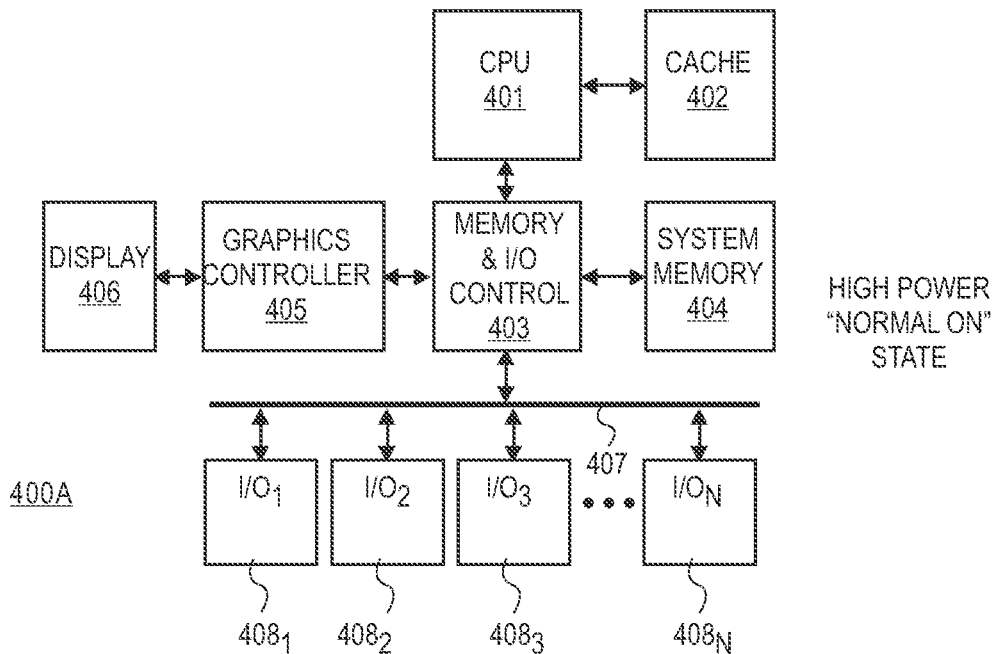
FIG. 4a through FIG. 4c demonstrate an embodiment of the relationship between active and inactive computing system hardware components for, respectively, a "normal on" state (FIG. 4a), a "main CPU/OS based low power" state (FIG. 4b), and a "non main CPU/OS based lower power" state (FIG. 4c)
Figure 4B:
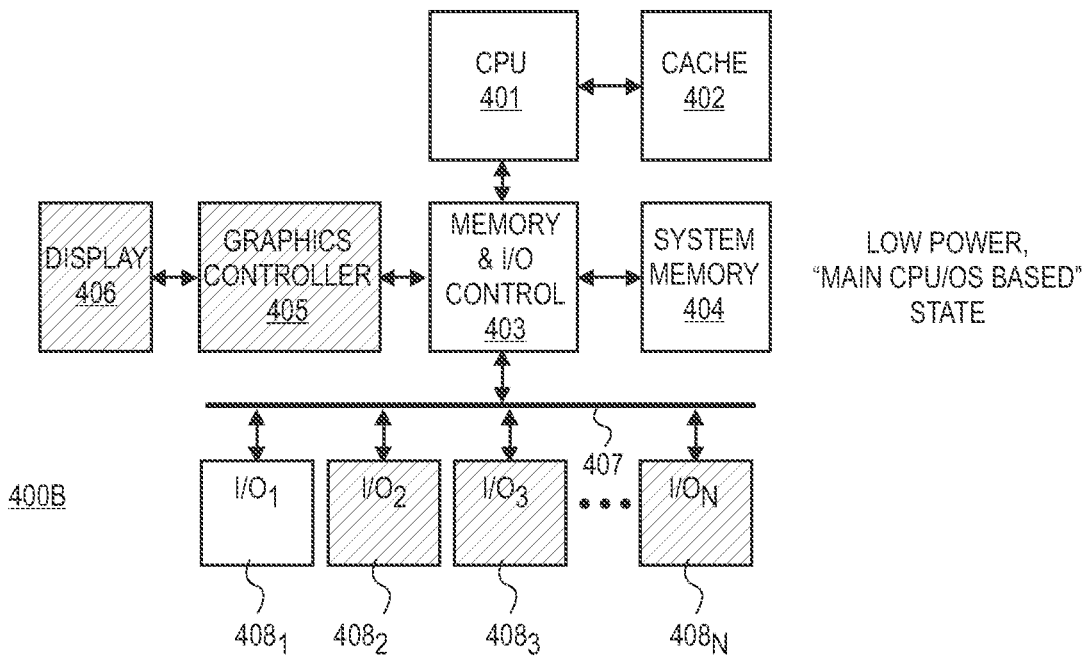
Figure 4C:
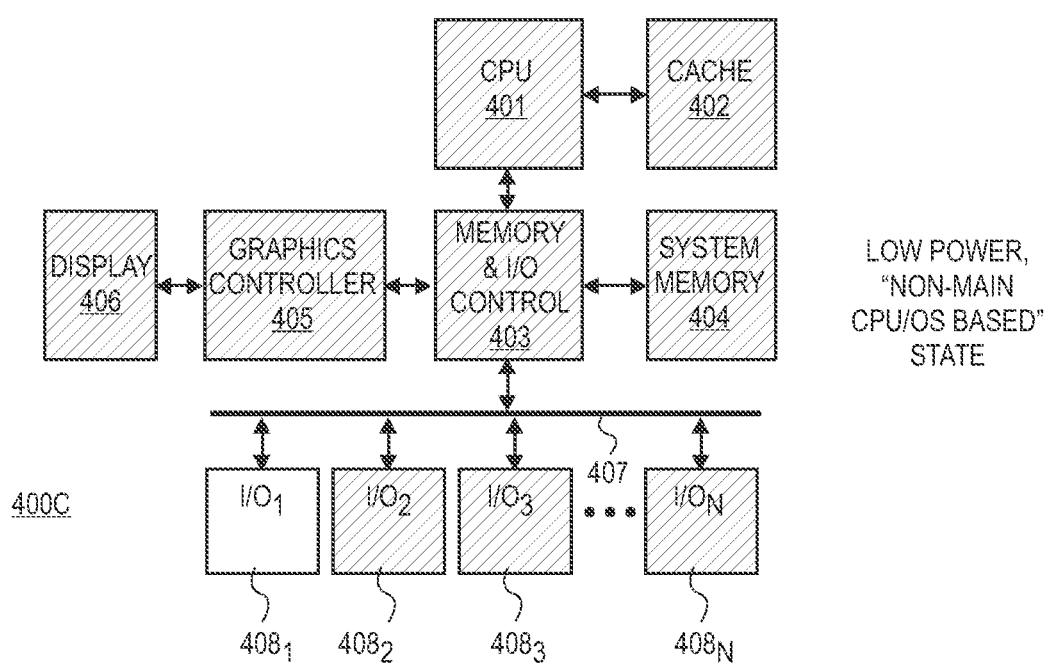

FIG. 3 presents a state diagram. FIGS. 4a through 4c show an exemplary depiction of the various components of an exemplary computing system that are not forced into a low power state or are forced into a low power state within each state from which useful tasks may be performed (where a shaded region indicates that a component has been forced to remain within an inactive low power state and a non shaded region indicates a component has not been forced to remain within an inactive low power state). It is important to note that, as explained in more detail below, both the computing system and the particular combination of inactive low power state forced components and non inactive low power state forced components that are observed in FIGS. 4a through 4c are exemplary and may vary from embodiment to embodiment.

According to the state diagram scheme observed in FIG. 3, a computing system has three primary states were useful tasks can be performed: 1) a high power, "normal on" state 301; 2) a "main CPU/OS based low power" state 304; and, 3) a "non main CPU/OS based lower power" state 305. FIGS. 4a through 4c show an exemplary embodiment of a single computing system for each of the above described states. A brief overview of each of these states is provided immediately below followed by a more thorough discussion of the "main CPU/OS low power" state 304 and the "non main CPU/OS lower power" state 305.

FIG. 4a shows an embodiment of a "normal on" state 301 computing system. Note that none of the computing system's various components have been forcibly entered into an inactive low power state because none of the components are shaded. In various embodiments, at least some of the computing system's components are given the authority to regulate their own power consumption (e.g., from a lowest power consumption state to a highest power consumption state) in light of detected usage. Here, by not forcing a component into an inactive low power state, components that have the ability to regulate their own power consumption are free to do so within the "normal on" state 301.

By contrast, FIG. 4b shows an embodiment of the same computing system after it has been placed into the "main CPU/OS based low power" state 304. Here, certain components (indicating by shading) have been forced into an inactive low power state. Consistent with this perspective, those components that have the authority to regulate their own power consumption and who are to be forced into an inactive low power state are stripped of their power regulation authority and are forced into their lowest power consumption state. Here, note that the term "inactive" means the component has ceased its primary function(s) so that power may be conserved. Note that the main CPU has not been inactivated and can therefore continue to execute software programs.

FIG. 4c shows an embodiment of the same computing system after it has been placed into the "non main CPU/OS based lower power" state 305. Here, note that additional components (in particular, the CPU) have been placed into an inactive low power state as indicated by additional shading as compared to FIG. 4b.

A more thorough discussion of the "main CPU/OS low power" state 304 and the "non main CPU/OS lower power" state 305 is provided immediately below.

Referring to FIGS. 3 and 4b, the "main CPU/OS based low power" state 304 corresponds to a state in which the main CPU 401 is powered on and can execute software; yet, the overall power consumption is reduced as compared to the "normal on" state 301. Because the main CPU can execute software based upon the main Operating System (OS), state 304 is referred to as "main CPU/OS based". Power may be reduced by one or more of the techniques described immediately below.

1) Computing system components other than the CPU that have the intelligence/ability to dynamically regulate their own power consumption are stripped of their authority to dynamically regulate their own power consumption; and, instead, are forced into their lowest power state. For example, in the case of an ACPI compliant system, various components within a computing system (including the display, graphics controller, various I/O devices (such as the hard disk drive), etc.) are given the authority to regulate their own power consumption (e.g., based upon observed usage through their device driver) according to a plurality of states D0 through D3; where, the D0 state is the highest power operating state and the D3 state is the lowest power non-operating state (D1 and D2 also being non-operating states with increasingly lower power). In an embodiment, the "main CPU/OS based low power" state 304 deliberately configures certain components to permanently remain within the D3 state so long as the system resides within the "main CPU/OS based low power" state 304. Non ACPI systems may be similarly configured. In FIG. 4*b*, components that have been forced into their lowest power state are shaded; hence, in the example of FIG. 4*b*, the graphics controller 405, the display 406 and I/O units $408_2$ through $408_N$ are forced into their lowest power state. In alternate embodiments, it may be possible to design certain components so that their power supply voltage is reduced or removed while the system is within the "non main CPU/OS based low power" state 304.

2) If the CPU is capable of dynamically adjusting its power consumption amongst a plurality of different power consumption states (e.g., by dynamically changing its internal voltage levels and/or clocking frequencies), the CPU is forced to operate within the lowest power state (or amongst the lowest power states). For example, Intel SpeedStep™ Technology based CPUs may have different "$P_n$" states: $P_0$ through $P_4$; where, $P_0$ is the highest power state and $P_4$ is the lowest power state. A SpeedStep™ Technology based CPU reduces power by reducing both its voltage and frequency to get a dramatic decrease in power with a moderate decrease in performance. In an embodiment that employs a Speedstep™ Technology based CPU, while the computing system is within the "non main CPU/OS low power" state 304, the CPU is forced to operate in the $P_4$ state (although some application policies may allow for special exceptions for entry into the next lowest power state $P_3$). Note that other CPUs may exist that reduce power by reducing either or both voltage and frequency—yet—are not SpeedStep™ Technology based CPUs. As such, the technique presently being described may be implemented with both SpeedStep™ Technology based CPUs and non SpeedStep™ based CPUs. In further embodiments, to the extent the internal clocking frequency can be adjusted while within a lowest power state, the clock frequency is set to the lowest clock frequency that the processor can properly operate at.

3) Defining application software programs that are not to be used within the "non main CPU/OS low power" state 304 and suspending their use during this state. Any software task or application that is deemed not useful or needed for the implementation of "main CPU/OS based" low power state 304 and the "non main CPU/OS based" lower power state 305 could be suspended to achieve very low system power. Examples may include a screen saver, a word processing application, a presentation/graphics application, and/or a spreadsheet application program. Moreover, any batch computing jobs could be suspended during operation in states 504 and 505.

Figure 1:
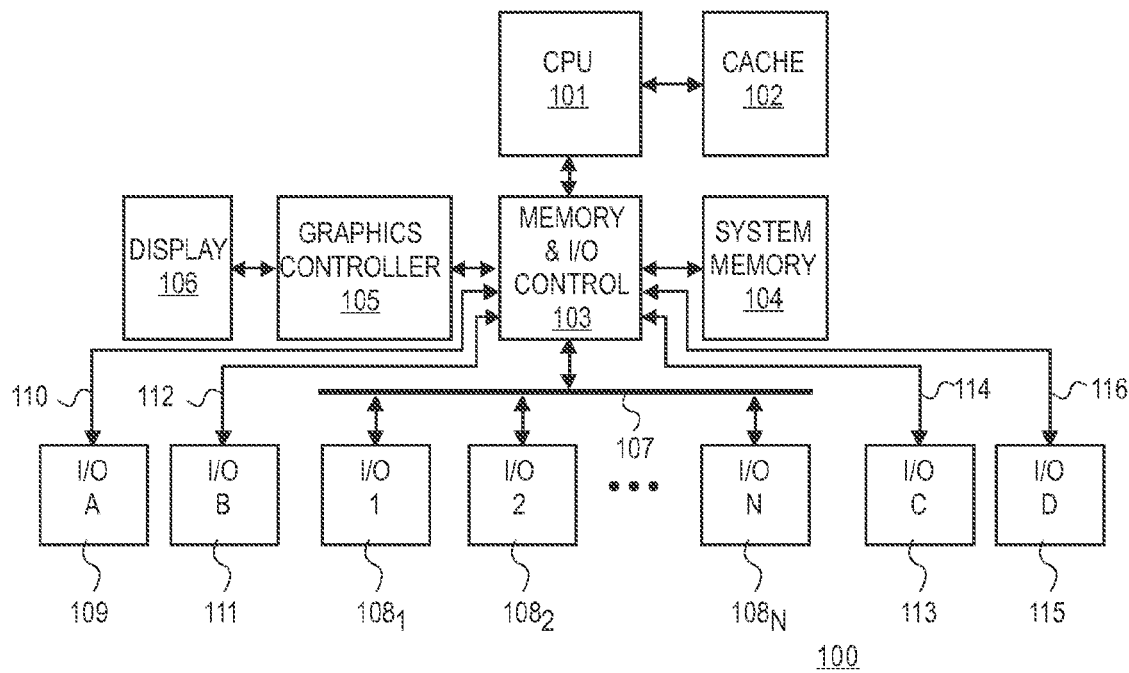
FIG. 1 shows an embodiment of a computing system.
Figure 2:
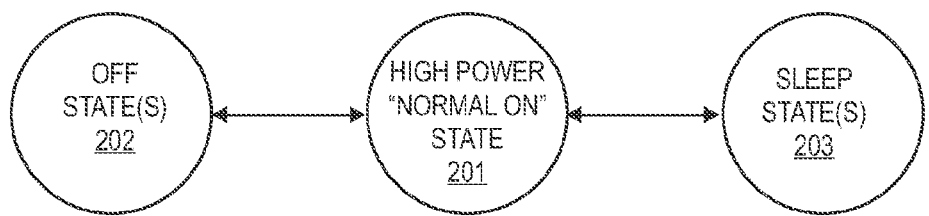
FIG. 2 shows a prior art state diagram for a computing system.

4) In a computing system having multiple main CPUs (i.e., CPU 101 of FIG. 1 actually includes a plurality of CPUs), the number of actively working CPUs is reduced (e.g., in a system having N main CPUs during the "normal on" state 301), only one such main CPU is active during the "main CPU/OS low power" state 304.

Referring to FIGS. 3 and 4*c*, the "non main CPU/OS based lower power" state 305 corresponds to a state in which the main CPU 401 is powered down so that it cannot execute software based upon the computing system's main OS. Note that in the example of FIG. 4*c* the cache 402 the system memory 404, and at least the memory controller portion of the memory I/O control unit 403 are also be forcibly entered into an inactive, low power state (because they largely support the main CPU's 401 efforts to execute software). Because the main CPU 401 is inactive, state 305 is "non main CPU/OS based". Moreover, at least because the CPU 401 has been made inactive, state 305 is "lower power" as compared to states 301 and 304. Hence, state 305 may be referred to as a "non main CPU/OS based lower power" state. It is important to note however, that the precise combination of components that are forced inactive during state 305 may vary from embodiment (e.g., as one example, a system may be designed that keeps system memory 404 active during the "non main CPU/OS based lower power" state 305 so that the system memory 404 can be used within that state 305.

Exemplary Implementation: Complete Cordless Telephone System

Figure 5:
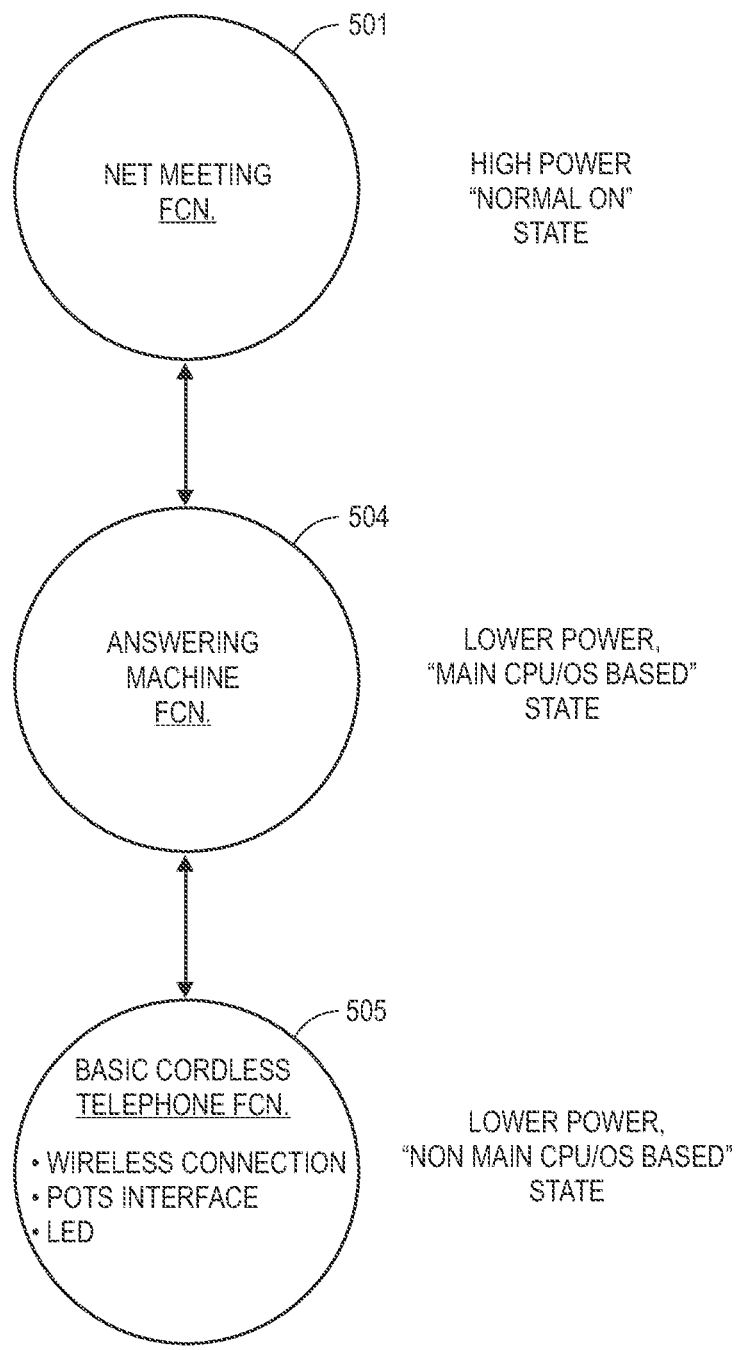
FIG. 5 shows an embodiment of the distribution of various functional roles for a complete telephone system across, respectively, a "normal on" state, a "main CPU/OS based low power" state, and a "non main CPU/OS based lower power" state.

The incorporation of states 301, 304 and 305 (e.g., as per the computing system powering profile observed in FIGS. 4*a* through 4*c*) allow a computing system to be specially tailored to produce certain tasks while in various stages of reduced power consumption- and, as a consequence, better efficiency should result. An example helps demonstrate the potential of this approach. FIG. 5 shows an exemplary "complete"—yet energy efficient—cordless telephone system that can be implemented with a computing system as outlined in FIGS. 3 and 4*a* through 4*c*. Here a complete cordless telephone system is a system that: 1) provides a basic cordless telephone function (i.e., a Plain Old Telephone Service (POTS) interface and a wireless link between a cordless telephone and the POTS interface); 2) an answering machine that records a caller's message should the cordless phone remain unanswered in response to the caller's call; and, 3) a Net Meeting engine that sets up an exchange over the Internet in response to a caller's ID being associated with a caller for which a net meeting is appropriate.

A basic implementation of the aforementioned complete cordless telephone system described above, as observed in FIG. 5, is to implement: 1) the basic cordless telephone function from within the "non main CPU/OS based lower power" state 505; 2) the answering machine function from within the "main CPU/OS based low power" state 504; and, 3) the Net Meeting engine from within the "normal on" state 501. By implementing the basic cordless telephone function within the "non main CPU/OS based lower power" state 505, the computing system can easily convert itself, as dictated by its usage, back and forth between "just" a basic cordless telephone function and a full fledged computing system. Referring to FIGS. 4*a* through 4*c* as the underlying computing system, note that: 1) the Net Meeting engine is implemented with the complete computing system of FIG. 4*a*; 2) the answering machine is implemented with the lower power main CPU based system of FIG. 4*b*; and, 3) the basic cordless telephone function is implemented with I/O unit $408_1$.

Note that the functional implementations described just above are consistent with their corresponding functional/processing capacity and power consumption requirements. That is, a basic cordless telephone function can easily be constructed from a few simple components and therefore: 1) can be easily integrated onto a single I/O unit (such as I/O unit $408_1$); and, 2) will consume small amounts of power (relative to an entire computing system). As such, a basic cordless telephone is an ideal function to be designed into I/O unit $408_1$ as one of the computing system's "non main CPU/OS based lower power" state 505 functions.

By contrast, an answering machine is a more complicated function that requires storage resources for both: 1) the recorded message to be played for a caller whose call has not been answered; and, 2) the caller's recorded message (if any). As such, although an answering machine can be integrated onto an I/O unit, it is probably more economical to use the storage resources of the computing system's main memory 404 for storing the recorded messages. Moreover, the main CPU 401 and main OS can be used to execute application software that manages the handling of recorded message playback (to both the caller whose call is not being answered and the computing system user who desires to hear a caller's message).

Note also that an answering machine often records a message when the user is not available to answer a call. As such, in most circumstances it is not an inconvenience if the display 406 and graphics controller 405 are not powered on (e.g., if the user is not at home to answer a phone call, the user is also not able to interface to the computing system through the display 406). Moreover, given that the main CPU 401 and main OS can be used to assist the operation of the answering machine as described just above, note that the answering machine tasks are by no means "high performance" tasks for a typical computing system CPU 401. As a consequence, these tasks can be easily implemented if the main CPU 401 is configured to have a reduced performance/power consumption state (e.g., by being forced to use lower internal voltages and/or lower clock frequencies).

Taking all of the aforementioned characteristics of an answering machine together, note that the answering machine function is well suited for the "main CPU/OS based low power" state 504. That is, referring to FIG. 4b, the display 406 and graphics controller 405 are inactive (so as to conserve power); and, the main CPU and OS can be used in a reduced performance/power consumption capacity to handle the message playback and message reporting functions. As a consequence, FIG. 5 indicates that the answering machine portion of the complete telephone system is implemented with the "main CPU/OS based low power" state 504. Thus, reviewing the discussion of FIG. 5 so far, the computing system's implementation of the telephone system are deliberately aligned with the computing system's operational states. That is, the lower power/lower performance basic cordless telephone function is designed into the "non main CPU/OS lower power" state 505; and, the more sophisticated answering machine function is designed into the "main CPU/OS low power" state 504.

Lastly, the Net Meeting function of the complete cordless telephone system of FIG. 5 is designed to be used while the computing system is within the "normal on" state 501. Here, software responsible for handling a transaction over the Internet may involve higher performance tasks (e.g., Layer 4 flow control, IP layer header processing, etc.). Moreover, the Internet connection may be established over another networking interface (e.g., a wireless interface) besides the POTS interface associated with the cordless telephone. As such, the Internet transaction may involve the use of an I/O unit other than the I/O unit in which the basic cordless telephone function is integrated (e.g., I/O unit $408_2$ if I/O unit $408_2$ provides a wireless interface). Thus, the Net Meeting function of the complete cordless telephone system is well suited for the computing system while it is within the "normal on" state (because the Internet communication capability of the normal computing system can largely be re-used for the Net Meeting communication function of the cordless telephone system).

Because the computing system can transition across the various states in the state diagram of FIG. 5, the complete cordless telephone system described above corresponds to a computing system that can swing back and forth between a "high power" computing system and a "lower power" basic cordless telephone based upon its usage. For example, as just one example, if a user is using the computing system for a traditional computing system use (e.g., writing a document and/or writing a document) the computing system will be in the "normal on" state 501. If the user then subsequently suspends this activity so as to temporarily abandon the computing system (e.g., by doing "something else" that is not computer related), the computing system may automatically drop down to its lowest power active state 505 (the "non main CPU/OS based lower power state") so as to behave and consume power as a basic cordless telephone system does. Note that in many cases a user may abandon a computing system for hours at a time—thus, dropping the computing system down automatically into the lower power state(s) causes the computing system to regulate its own power consumption as a function of the manner in which it is being used.

The computing system can also therefore be viewed as a hybrid between a traditional "high power" computing system and a low end appliance (in this case, a basic cordless telephone). When the user uses the system for traditional computing purposes (e.g., document writing, web surfing, etc.), the system behaves as a traditional computing system; and, when the user is not using the system as a traditional computing system, the system degrades (in terms of functionality and power consumption) into a basic appliance (in this case, a basic cordless telephone function). As the state diagram observed in FIG. 5 indicates that the computing system is capable of transferring back and forth between the various useful states 501, 504, 505; likewise, the computing system is capable of transferring back and forth between a traditional computing system and a basic appliance.

Moreover, continuing with the example provided just above, if the user, after temporarily abandoning the computer, receives a telephone call and cannot answer the telephone call; then, the computing system can trigger a state transition from the lowest power operable state 505 to the intermediate power operable state 504 so as to convert itself from a basic cordless telephone (as represented by state 505) into a basic cordless telephone having an answering machine (as represented by state 504). In this case, note that the system is able to tweak its functional abilities and corresponding power consumption in light of the overall uses that present themselves to the system.

Continuing with this same example, after recording the caller's message (e.g., by storing it to system memory 404), the software associated with the "main CPU/OS based low power" state 504 may be written so as to drop the system back into the lower power state 505 (absent the return of the user for traditional computing system uses) so as to convert the computing system back into a basic cordless telephone. Thus, in light of these state transitions, note that the computing system is not only able to tweak its functional capabilities and corresponding power consumption between a traditional computing system (state 501) and basic appliance (the basic cordless telephone of state 505); but, is also able to tweak its functional capabilities and corresponding power consumption to that of an "intermediate" appliance (the answering machine of state 504) as well. Moreover, the above described conversions between the various functional capabilities can be automatically triggered in light of whatever uses present themselves to the computing system over time.

An example of a complete cordless telephone system that shows a sequence of events sufficient to cause the establishment of a net meeting is provided in more detail below with respect to FIG. 11.

State Transition Methodology and Supporting Hardware

Figures 6A, 6B:
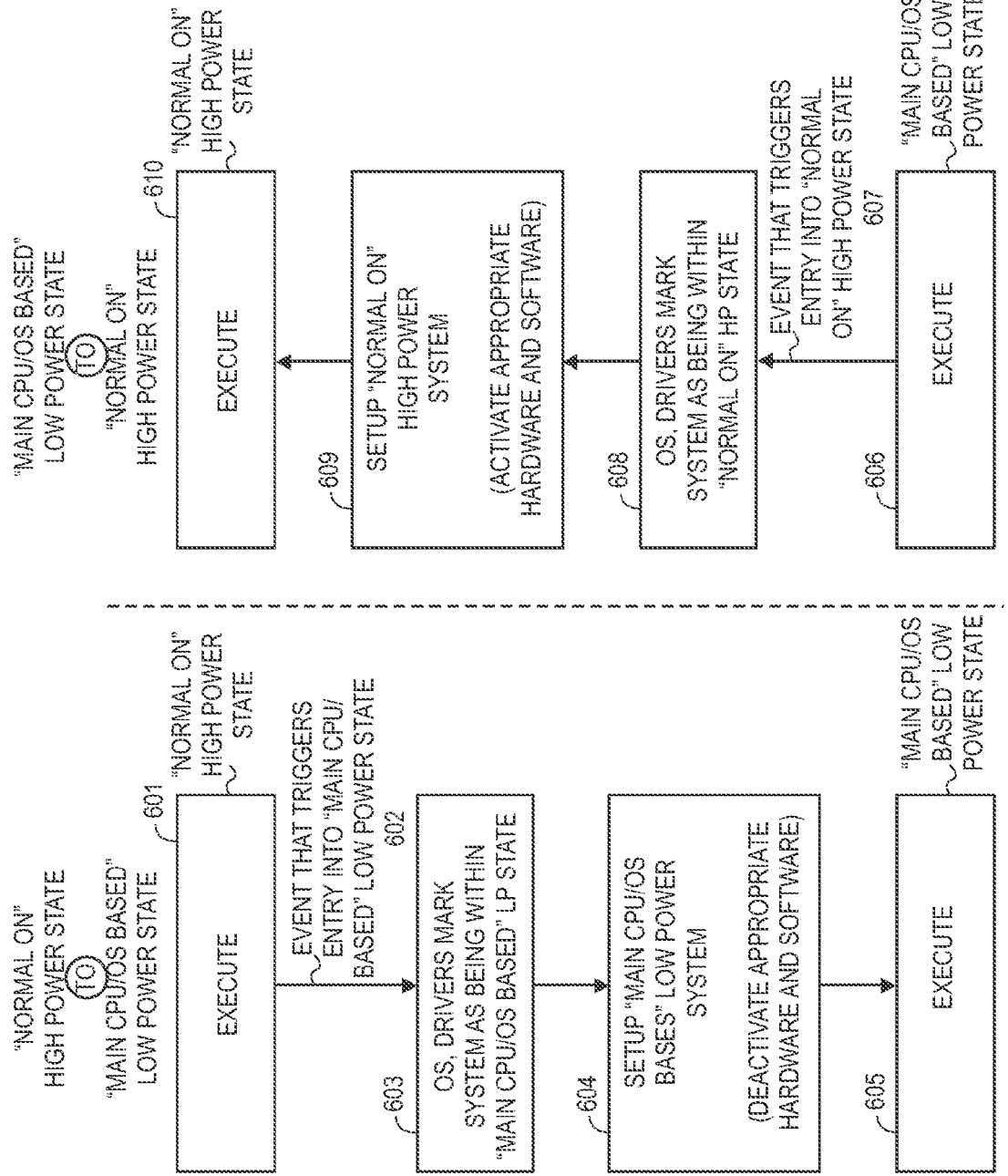
FIGS. 6a and 6b demonstrate exemplary method flows for transitioning from a "normal on" state to a "main CPU/OS based low power" state (FIG. 6a); and, for transitioning from a "main CPU/OS based low power" state to a "normal on" state (FIG. 6b)
Figure 7:
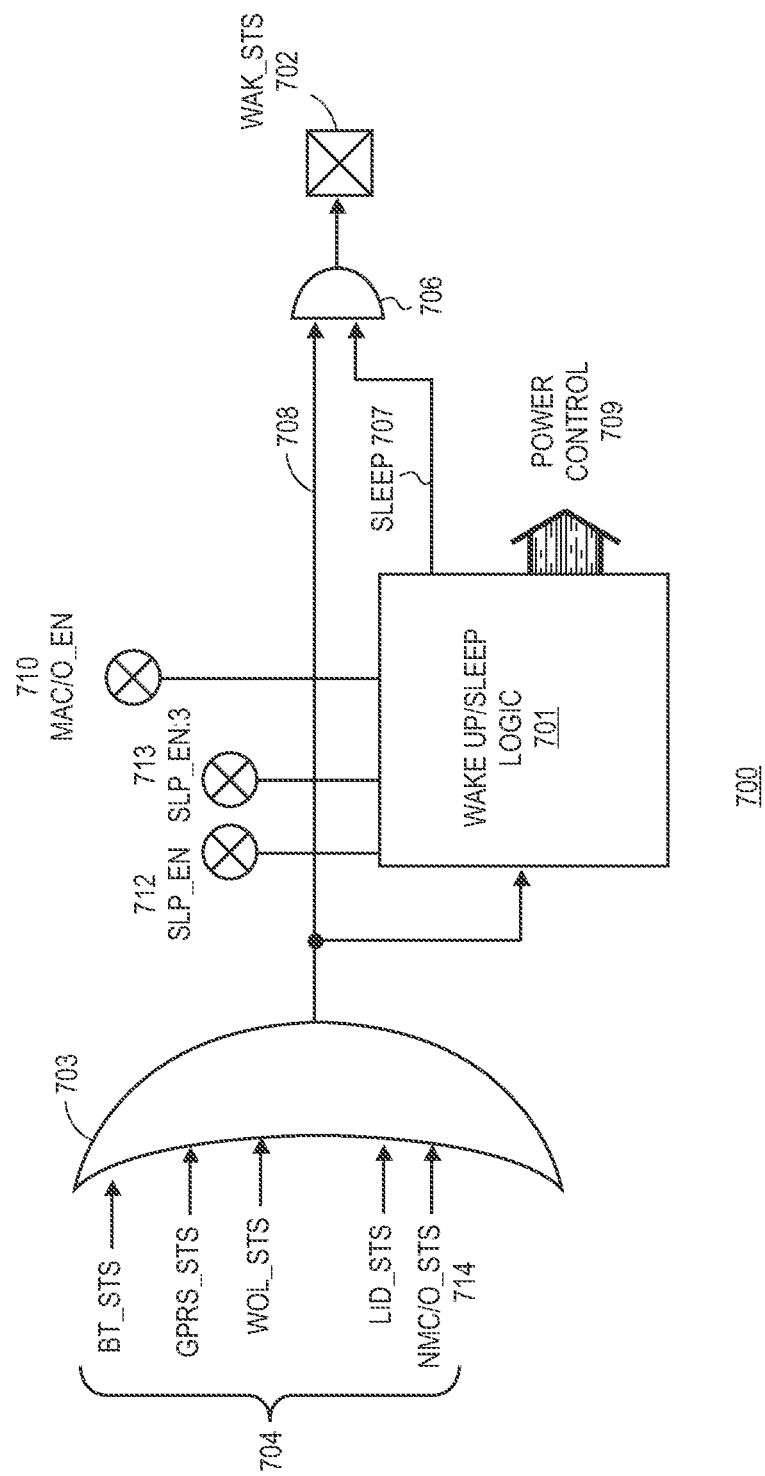
FIG. 7 shows an embodiment of state transition logic that may be used to assist/control a computing system's transitions between: 1) a "normal on" state and one or more sleep states; and, 2) a "main CPU/OS based low power" state and a "non main CPU/OS based lower power" state.
Figure 8A:
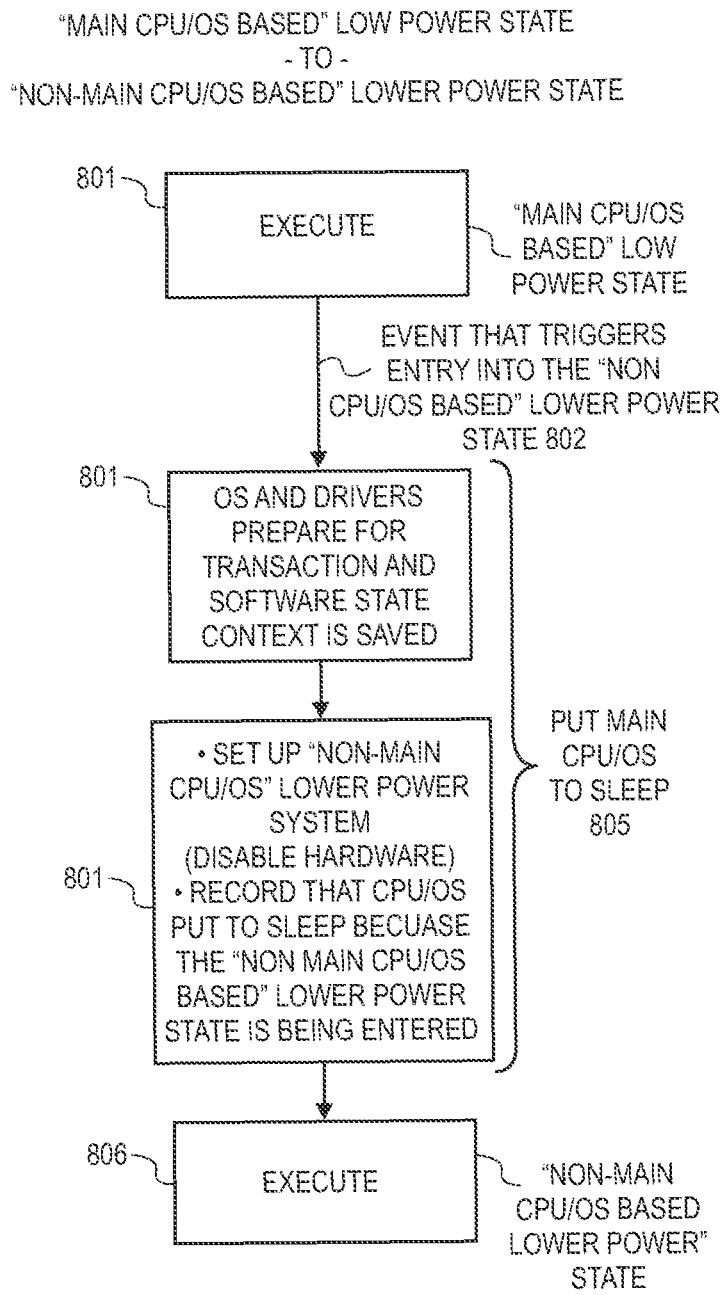
FIGS. 8a and 8b demonstrate exemplary method flows for transitioning from a "main CPU/OS based low power" state to a "non main CPU/OS based lower power" state (FIG. 8a); and, for transitioning from a "non main CPU/OS based lower power" state to a a "main CPU/OS based low power" state (FIG. 8b)
Figure 8B:
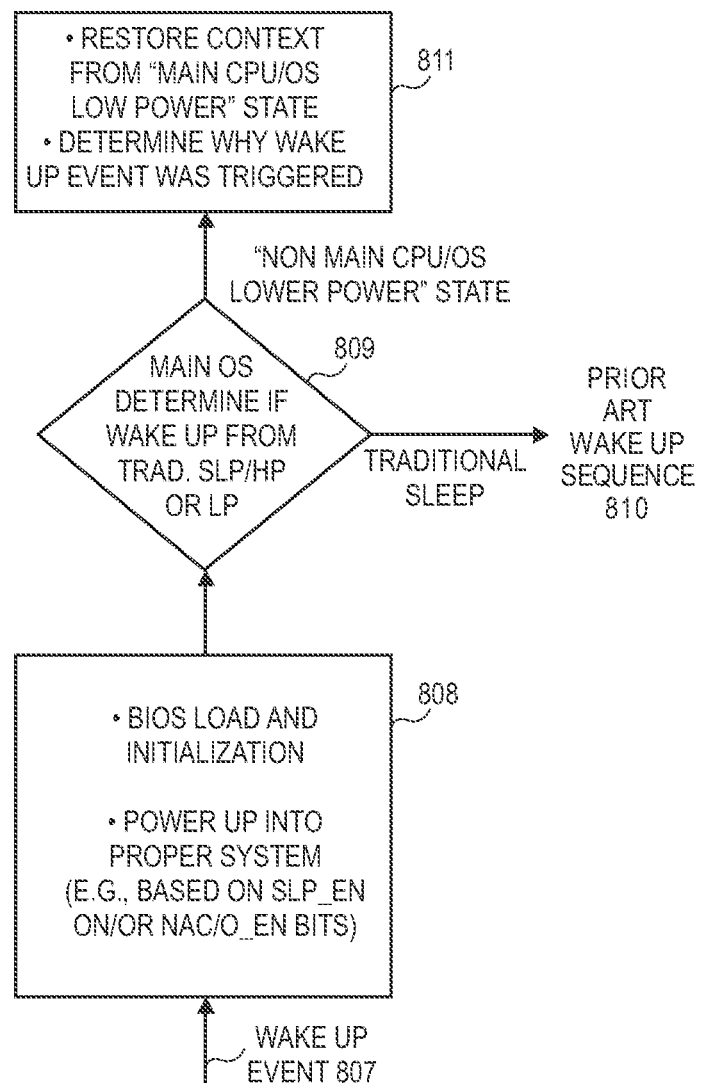

Given that the above example describes a working system that is able to transition itself between various useful states 501, 504, 505 (each having their own degree of functional ability and power consumption), the manner in which these state transitions are implemented are of some import. FIGS. 6a,b through 8a,b are directed to these state transition aspects. In particular, FIGS. 6a and 6b provide methodologies for state transition between the high power "normal on" state 301 and the "main CPU/OS based low power state" 304 of FIG. 3. FIGS. 8a and 8b provide methodologies for state transition between the "main CPU/OS based low power" state 304 and the "non main CPU/OS based lower power" state 305. FIG. 7 provides an embodiment of a circuit design that can be used to assist the state transition process.

FIG. 6a shows an embodiment of a methodology that may be executed by a computing system to transition from the high power "normal on" state 301 to the "main CPU/OS based low power" state 304. According to the methodology of FIG. 6a, the system is initially "executing" within the "normal on" high power state 601. In this state, the system can be used for traditional computing purposes. At some instant, an event is detected 602 that triggers the transition process from the "normal on" state to the "main CPU/OS based low power" state. The event may vary from embodiment to embodiment and application to application.

For example, as just a few possible instances, the computing system may recognize that no stimulus has been provided by a user over an extended period of time (e.g., the user has not used a mouse or typed on a keyboard for an extended period of time); or, the computing system may recognize that the user has closed the lid of the computing system (if the computing system is a handheld device such as a laptop/notebook computer); or, has powered off the screen/display (if the computing system is a typical "desktop" system). Note that whether the event should cause the system to enter the "main CPU/OS low power" state or a prior art sleep state 303 may be determined in light of various conditions that may vary from embodiment to embodiment and application to application. As just one example, if a lower power operational state is recognized as being "active" by setting a flag in software (e.g., if the basic cordless telephone system is recognized as being active), the system automatically transfers to a lower power operational state 304, 305 rather than a prior art sleep state 303.

In response to the detected event 602, the OS marks itself 603 as being within the "main CPU/OS low power" state. Here, recall again that the "main CPU/OS" component of this low power but operational state means that the main CPU is still operational and the main OS is still operational so that one or more application software programs can be executed on the main CPU and OS. As such, the OS marks itself 603 so that it can formally recognize that it is operating within a lower power state. Appropriate software drivers may similarly mark themselves. The "main CPU/OS based low power" state 304 is then setup or established 604. In this case, recall that state 304 may be implemented by: 1) stripping the authority of various components (e.g., the graphics controller and display) to regulate their own power consumption; and/or 2) forcing the CPU to remain within a lower performance/lower power consumption mode; and/or 3) parking certain application software programs or tasks; and/or 4) reducing the number of active main CPUs within a multiple main CPU system; and/or, 5) removing or lowering power to various components. Any software that is deactivated for the "main CPU/OS low power" state may have its context saved so that it can recall its operating environment upon return to the "normal on" state. Once the "main CPU low power state" has been set up, the system executes 605 in that state.

The transition of the system from the "main CPU/OS based low power" state to the "normal on" state, an embodiment of which is observed in FIG. 6b, can be implemented as largely the reverse of the "normal on" state to "main CPU/OS based low power" state transition. That is, referring to FIG. 6b, while executing 606 within the "main CPU/OS based low power" state, an event is detected 607 that triggers a state transition toward the "normal on" state. Again, the precise nature of the triggering event 607 may vary from embodiment to embodiment and application to application. In the case of an answering machine, as described above with respect to FIG. 5, the triggering event 607 may be the recognition that a Net Meeting needs to be established for a presently received call.

In response to the triggering event 607, the OS and applicable device drivers mark themselves 608 as being within the "normal on" state. The "normal on" state is then established/setup 609 (e.g., by granting various components to regulate their own power consumption, allowing the main CPU to operate in a higher performance/power consumption mode, re-activating "parked" application software programs and restoring their context, re supplying various components with their proper supply power). Once the "normal on" state is established, the system executes 610 in the "normal on" state.

Because the main CPU/OS is powered/kept awake during the "main CPU/OS based low power" state, the main CPU and main OS are not put to sleep during a state transition process between the "normal on" state and the "main CPU/OS based lower power state". By contrast, the "non main CPU/OS" component of the "non main CPU/OS based lower power" state indicates that main CPU/OS are put into an inactive state. As a consequence, transitioning to the "non main CPU/OS based lower power" involves putting the main CPU/OS into a sleep state. Generally, when the main CPU/OS "awakes" after being put to sleep, the initial phases of the "wake-up" process are similar to those processes that are executed when the entire computing system is first powered on as a whole or when the computing system comes out of a RESET condition. That is, basic BIOS software has to be loaded and executed along with the OS itself.

A principle difference, however, between a basic power up or RESET response and a return from a sleep state is that, when returning from a sleep state, the initial software loading process recognizes that the system is returning from a sleep state. This recognition, in turn, causes the reloading of the previously stored context. By contrast, when initializing from a basic power up or RESET, no such recognition or context exists. Here, one or more specific bits that are stored in specific looked for locations are used during the wake up process so that the system can determine whether it is initializing from a basic power up/RESET or a from a sleep state (and in various cases what type of sleep state the system is being awoken from). If one or more bits indicate that the system is returning from a sleep state the saved context is restored so that system can return to its original environment.

The existence of these looked for bits indicate that some limited amount of hardware associated with the CPU and/or memory controller and/or I/O controller function remains powered on during the time period in which the main CPU/OS is sleeping. An embodiment of this limited hardware is observed in FIG. 7. The specific circuit design of FIG. 7 not only provides for recovery from a sleep state that was initiated by entry into a "non main CPU/OS based low power state"; but also, is compatible with recovery from prior art ACPI compliant sleep state(s). As such, referring to FIGS. 3 and 7, the circuit design of FIG. 7 can be used by an ACPI compatible system to handle both: 1) the transition from traditional sleep state(s) 303; and, 2) the transition from the "non main CPU/OS based lower power" state 305.

In various embodiments the circuit used for recovery from a sleep state (such as the circuit of FIG. 7) is integrated with the memory controller and/or I/O controller functions. In a further embodiment, the memory controller function is implemented with a first semiconductor chip and the I/O controller function is implemented with a second semiconductor chip. In this case the circuit used for recovery from a sleep state (such as the circuit of FIG. 7), may be integrated onto either the memory controller semiconductor chip or the I/O controller semiconductor chip.

Referring now to FIG. 7, a "looked for" bit that indicates to a waking system whether or not the system is waking from a sleep state or from a basic power/RESET state corresponds to the bit 702 ("WAK_STS"). The operation that determines the state of the "WAK_STS" bit 702 will be described in more detail below. The "SLP_EN" and "SLP_TYP" bits 712, 713 are written to when the system as a whole is entering a traditional "non operational" sleep state (e.g., state(s) 303 of FIG. 3). Here, the "SLP_EN" bit 712 indicates that the system is entering a traditional non operational sleep mode and the "SLP_TYP" bits 713 indicate what specific type of traditional non operational sleep state is being entered (e.g., S0 through S4 in an ACPI based system) noting that the particular SLP_TYP embodiment of FIG. 7 uses three bits.

When the system is entering a traditional non operational sleep state, both the "SLP_EN" and "SLP_TYP" bits 712, 713 are used by the wake/up sleep logic 701 to establish the appropriate power supply voltage scheme within the computing system. That is, each type of traditional sleep state mode may have its own unique power supply voltage scheme (e.g., some components may have supply removed, some components may have power supply voltage reduced, etc.). Output 709 is used to implement the proper power supply scheme for the indicated traditional sleep mode. Note that if a particular sleep mode scheme logically disables one or more components rather than tweaking their power supply voltage (e.g., by shutting down an input clock, activating a disable bit, etc.), wake up/sleep logic 701 and output 709 may be used for disablement purposes as well.

The "NMC/O_EN" bit 710 is written to when the system is transitioning from the "main CPU/OS based low power" state 304 to the "non main CPU/OS based lower power" state 305. Here, because the "non main CPU/OS based lower power" state may have its own unique power supply voltage scheme (e.g., as to what specific components have their supply power removed, reduced, etc.), in one embodiment, the wake up/sleep logic 701 has a special "NMC/O_EN" input bit 710 to indicate that the power supply scheme specific to the "non main CPU/based lower power state" is to be engaged.

In an alternate embodiment the notion of "sleep", even within the "non CPU/OS based lower power" state, is marked by the "SLP_EN" and "SLP_TYP" bits 712, 713 (e.g., by using a unique/heretofore unused combination of SLP_TYP bits to signify the "non main CPU/OS based" state). Here, the "NMC/O_EN" bit can be used as additional information that, when set, informs the wake up/sleep logic 701 that "non main CPU/OS based lower power" state is being transitioned to. Regardless, the output 709 is used to establish the proper power scheme. Again, note that if the "non main CPU/OS based lower power" state 305 logically disables one or more components rather than tweaking their power supply voltage (e.g., by shutting down an input clock, activating a disable bit, etc.), wake up/sleep logic 701 and output 709 may be used for disablement purposes as well.

The input bits 704, 714 to the multiple input OR gate 703 are wake event bits. That is, upon the arrival of an event sufficient to cause the main CPU/OS to be awoken from a traditional sleep state or the "non main CPU/OS based lower power" state, at least one of these input bits 710, 714 is activated. This causes net 708 to become active; which, in turn, causes the WAK_STS bit 702 to become active. In response to the WAK_STS bit 702 being active, the main CPU/OS recognizes that it is being awoken from a sleep state; and, then, may look to bits 704, 714 to further recognize why the system was awoken. Moreover, depending on implementation, the main CPU/OS can recognize that it is being awoken from the "non main CPU/OS based lower power" state by reading the status of the NMC/O_EN bit 710 or the status of the NMC/O_STS bit 714.

Because the NMC/O_EN bit 710 is set active to enter the system into the "non main CPU/OS based lower power" state, in one embodiment, bit 710 can be read during wake up in order to recognize that the system is waking up from the "non main CPU/OS based lower power" state. Note that, in this case, bit 710 is a read/write bit in the sense that it can be both written to (for entry into the "non main CPU/OS based lower power" state) and read from (for transition from the "non main CPU/OS based lower power" state). In this particular case, the NMC/O_STS bit 714 is used simply to notify the circuitry of FIG. 7 that the system is being removed from the "non CPU/OS based lower power" state (i.e., a wake up event has occurred).

In an alternate embodiment where the SLP_TYP bits 713 are used to indicate that the system is entering the "non main CPU/OS based lower power" state (e.g., through a unique/heretofore unused combination of SLP_TYP bit settings), these same SLP_TYP bits are read from in order to recognize that the system is awaking from the "non main CPU/OS based lower power" state. In another alternate embodiment, the system is configured to look to the NMC/O_STS bit 714 to recognize whether or not the system is waking from the "non CPU/OS based lower power" state (i.e., if bit 714 is active upon wake-up; then, the system is waking up from the "non main CPU/OS based lower power" state). Bits 704 are "prior art" ACPI bits that correspond to traditional wake events (e.g., vis-à-vis the LID_STS bit, the opening of a laptop/notebook computer's previously closed lid).

FIGS. 8a and 8b show, respectively, methodologies sufficient for transitioning the computing system from the "main CPU/OS based low power state" 304 to the "non main CPU/OS based lower power" state 305 (FIG. 8a); and, from the "non main CPU/OS based lower power" state 305 to the "main CPU/OS based low power state" 304 (FIG. 8b). Referring to FIG. 8a, the system is initially executing within the "main CPU/OS based low power" state 801. At some point, an event is detected 802 sufficient to trigger the system into the "non main CPU based lower power" state 305 (e.g., the answering machine function 504 of FIG. 5 has completed its recording of an unanswered caller's call and the user has not returned to the computing system).

As a consequence, the main CPU and OS are put to sleep 805. This involves: 1) preparing the OS and drivers for the transaction and the storing of context 803; and, 2) recording that the main CPU/OS is being put to sleep because it is entering the "non main CPU/OS based lower power" state (e.g., by setting the NMC/O_EN bit 710 of FIG. 7 and/or the SLP_EN and SLP_TYP bits 712, 713) and setting up 804 the "non main CPU/OS based lower power" power consumption state (e.g., by powering down the power planes for the CPU, memory controller, system memory, etc.; e.g., as provided by wake up/sleep logic 701). After this has been done, the system executes 806 from the "non main CPU/OS based lower power" state.

FIG. 8b provides a more generic wake up sequence that the computing system may follow as it awakes from either a traditional sleep state 303 or from the "non main CPU/OS based lower power" state 305. According to the process of FIG. 8b, a wake event 807 triggers the main CPU to come out of a sleep state and the BIOS software is loaded 808. In the case of a transition from a traditional sleep state the wake event 807 may be an indication that the user has returned to use the system (e.g., by lifting the lid of a closed notebook/laptop vis-a-vis the LID_STS input of FIG. 7). In the case of a transition from the "non main CPU/OS based lower power" state, the wake event 807 may be caused by a need to use a function that is not operable within the lower power state (e.g., an answering machine in light of an unanswered call).

In response to the BIOS being loaded so as to initialize appropriate hardware, control of the system is handed off to the main OS which determines 809 whether or not the wake up event 807 corresponds to a transition from a traditional sleep state 303 or from the "non CPU/OS based lower power" state 305. Here, depending on implementation, the main OS can refer to bits 712, 710 and/or 714 of FIG. 7 to make this determination 809. If the system is transitioning from a traditional sleep state 303, a prior art wake up sequence may be followed 810. If the main OS determines that the system is transitioning from the "non main CPU/OS based low power" state, the main OS will attempt to understand 810 why the non main CPU/OS based subsystem generated the trigger event.

Here, if the non main CPU/OS lower power subsystem includes a processor that executes software (as explained in more detail below with respect to FIG. 9), the main CPU/OS can send a message to the non main CPU/OS lower power subsystem to determine why the trigger event 807 was generated. If the non main CPU/OS subsystem does not execute software, the main OS can look into, for example, additional hardware bits that were set by the non main CPU/OS to inform the main OS as to the nature of the trigger event 807.

Note that, bit 710 of FIG. 7 can be deactivated to cause wake up/sleep logic 701 of FIG. 7 to properly power up the hardware into a "normal on" state (e.g., as observed in FIG. 4a) if the transition is from a traditional sleep state 303. Likewise, depending on implementation, bit 710 and/or bit 712 can be deactivated to cause wake up/sleep logic 701 to properly power up the hardware into a "main CPU/OS based low power" state (e.g., as observed in FIG. 4b) if the transition is from the "non main CPU/OS based low power" state 305.

Non Main CPU/OS Based Lower Power State Hardware and Software Design

Figure 9A:
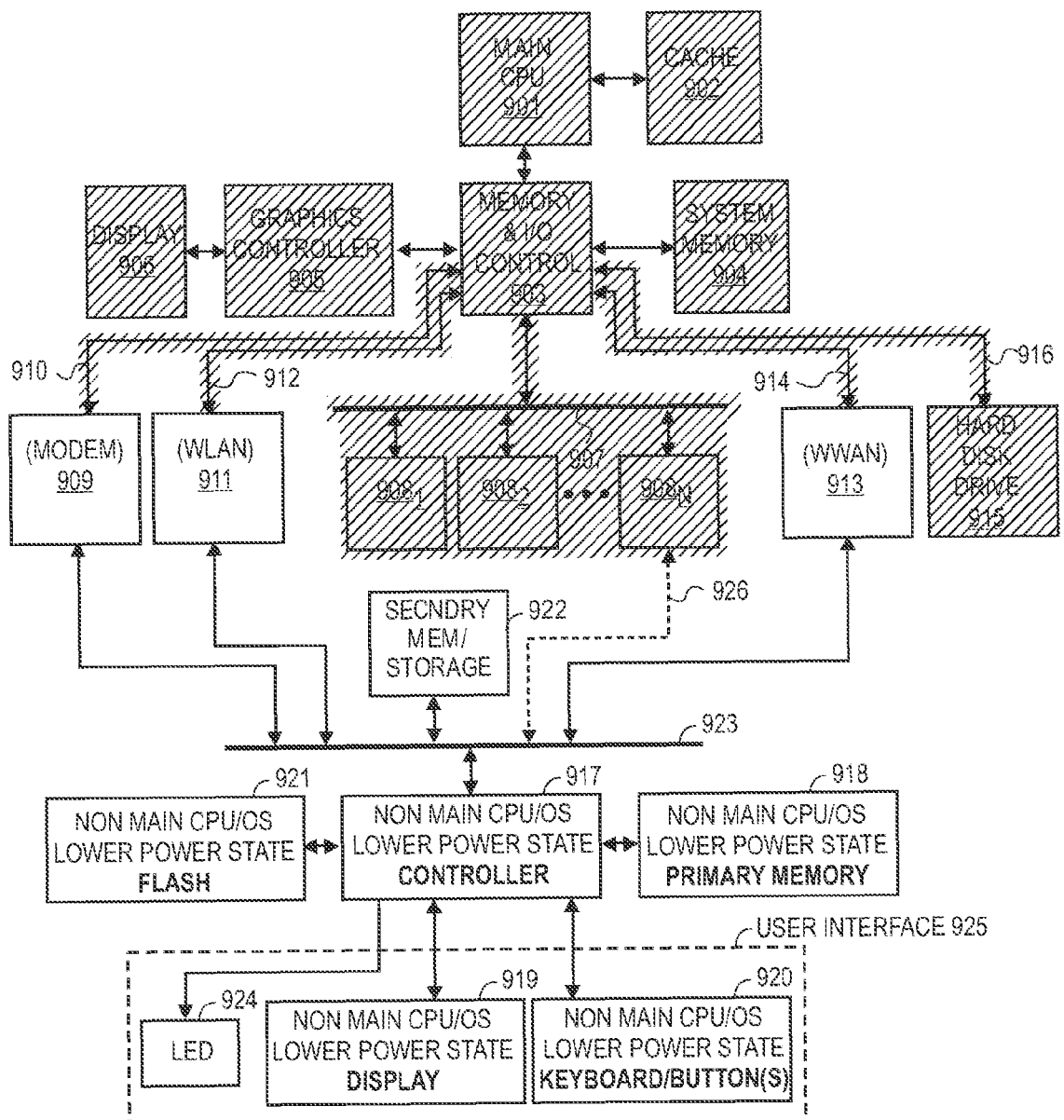
FIG. 9a shows a more detailed embodiment of a computing system having a low power but operable non main CPU/OS based subsystem.
Figure 9B:
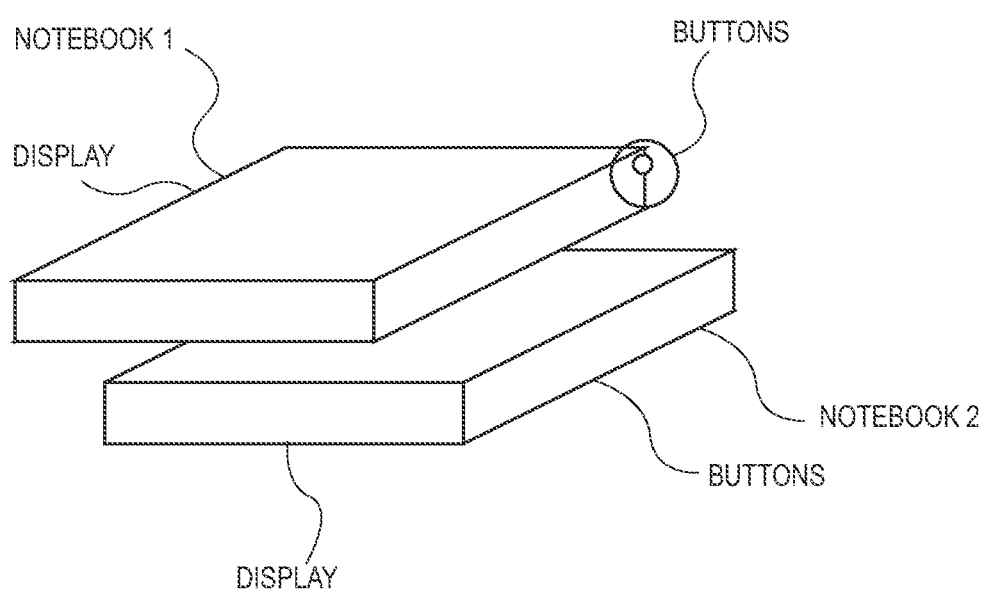
FIG. 9b shows an embodiment of a pair of mobile computing systems that each provide a "closed lid" user interface.

FIGS. 9a and 9b are presently used to support a more detailed discussion of possible hardware and software designs for the "non main CPU/OS based lower power" state. Here, the present discussion can be viewed as a more detailed elaboration of the discussion that was originally presented with respect to FIG. 4c. Referring briefly back to FIG. 4c, recall that a simplistic version of the hardware used to implement the "non main CPU/OS based lower power" state was provided; where, more specifically, a single I/O unit 408₁ was activated to implement the non main CPU/OS state 305.

By contrast more elaborate non main CPU/OS state 305 hardware implementations are presently envisioned that can be viewed as lower power/lower performance computing systems having identifiable software and I/O. FIG. 9a shows an example. In the depiction of FIG. 9a, a computing system is shown having a main CPU/OS based system (which include main CPU 901, cache 902, system memory 904, graphics controller 905, main display 906, etc.). Many major components of the main CPU/OS based system are deactivated while in the "non main CPU/OS based lower power" state. Similar to the scheme of FIGS. 4a through 4c, the components which are deactivated during the "non main CPU/OS based lower power" state are drawn as shaded regions in FIG. 9a.

Hence, according to the embodiment of FIG. 9a, the computing system used to implement the "non main CPU/OS based lower power" state includes its own distinctive: 1) controller 917 (which may be implemented by a lower performance/lower power processor, microcontroller, logic state machine, etc. as compared to the main CPU); 2) primary memory 918 (which may be implemented with lower speed random access memory (RAM) and/or less dense RAM as compared to the main system memory 904); 3) user interface 925 (which may include a display 919, keyboard/buttons 920 and LED 924); 4) system bus 923; 5) I/O unit 922 (which may be implemented, as just one example, with storage resources such as a FLASH based memory or polymer based memory); and, 5) FLASH memory 921.

Apart from the distinctive features highlighted just above, note that the computing system used to implement the "non main CPU/OS based lower power" state may also share various I/O units with the main CPU/OS computing system. In the embodiment of FIG. 9a, the shared I/O units include: 1) a MODEM unit 909; 2) a Wireless Local Area Network (WLAN) unit 911; and, 3) a Wireless Wide Area Network (WWAN) unit 913. Here, these "shared" I/O units 909, 911, 913 are active during the "non main CPU/OS based lower power" state. Other shared I/O interface units are possible as well (e.g., Bluetooth). In various embodiment, "shared" I/O units operate within the pair of computing systems (main CPU/OS and non main CPU/OS) by taking commands from the main CPU/OS system when not in the "non main CPU/OS based lower power" state; and, by taking commands from the non main CPU/OS system when in the "non main CPU/OS based lower power" state). It is also possible that a shared I/O unit may be plugged into the main system bus 907 (e.g., I/O unit 908$_N$ as represented by communication interface 926).

In one embodiment, interfaces 910, 912, 914 and 916 (which are inactive during the "non main CPU/OS based lower power" state) respectively correspond to: 1) for interface 910, a serial port interface (in which case MODEM 909 may further correspond to a V.90 MODEM 909); 2) for interface 912, a USB interface for an IEEE 802.11 based network interface card; 3) for interface 914, a serial interface for a General Packet Radio Services (GPRS) wireless modem; for 4) for interface 916, an ATA-100 interface for an IDE Hard disk Drive (HDD). In further embodiments, a Universal Serial Bus (USB) interface that emanates from the I/O controller portion of the memory and I/O control function 903 (not shown in FIG. 9a for simplicity) is deactivated within the "non main CPU/OS based lower power" state and includes having a Bluetooth I/O unit. Here, the Bluetooth interface unit may also be shared so as to be active during the "non main CPU/OS based lower power" state.

In another embodiment the system bus 923 can be the same system bus 907. In this case the main CPU 901 can access devices $908_1$ to $908_N$ in addition to the Controller 917 while in the "normal on" State 301. However the Controller 917 can then access devices $908_1$ to $908_N$ through the system bus 923/907 (which in this embodiment is the same bus, but not shown in FIG. 9a for clarity) when the system is in the "non main CPU/OS lower power" state 304. Note that in this embodiment, devices $908_1$ to $908_N$ would remain active (not shaded) in the "non main CPU/OS lower power" state 304 in order for the Controller 917 to access them.

Note that the non main CPU/OS system may include its own distinctive user interface 925. The embodiment of FIG. 9a indicates that the distinctive user interface includes an LED 924 (whose status is controlled by controller 917), a display 919, and keyboard/button(s) 920. The mechanical positioning/layout of the user interface 925 may add to its distinctiveness with respect to the "non main CPU/OS based lower power" state. In particular in a mobile computing application (e.g., laptop/notebook computer) the user interface 925 may be positioned/laid out so that the user can view the display 919 and LED 924; and/or use the keyboard/button(s) 920 when the lid of the main display 906 is closed so as to cover the main keyboard FIG. 9b shows a pair of laptop/notebook computing systems each having a user interface that can be accessed when the "lid" of the computing system is closed.

Examples of data which could be accessed on this closed lid user interface are calendar, contact and to do information; commonly referred to as Personal Information Management (PIM) data; however it is not limited to this type of data and can include any information which might be important for an end user that uses a notebook computer in a "closed lid" state (e.g. current sales data for a traveling salesperson). Additionally the overall computing system may allow for the control of functions within the notebook through a closed lid user interface. An example of this could be the playing of MP3 music files stored on the computer through a wireless headset. In this case the user could control the playing of music (song selection, volume, and other attributes) through the closed lid user interface.

Figure 10:
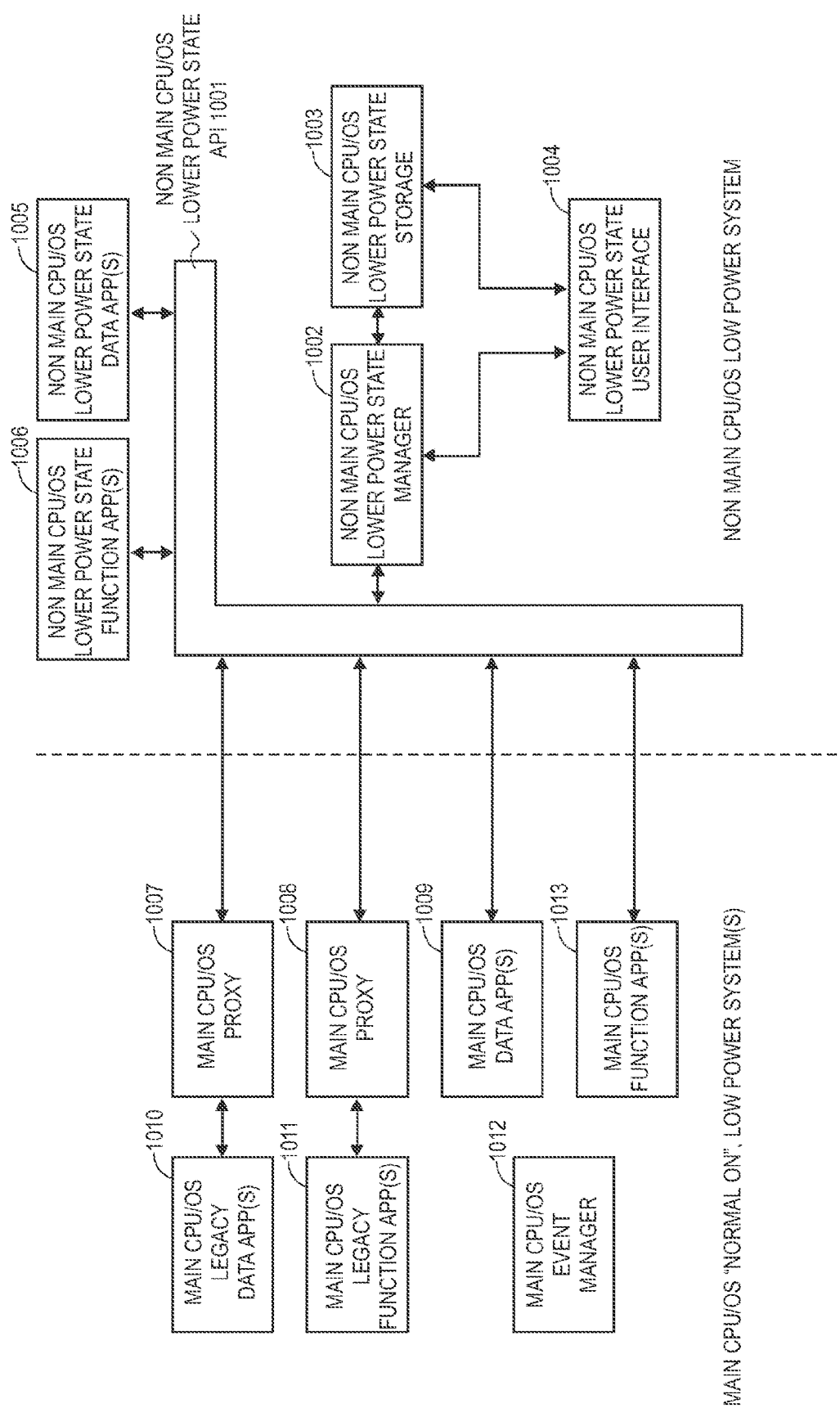
FIG. 10 shows an embodiment of a software architecture for a "main CPU/OS based low power" state, an embodiment of a software architecture for a "non main CPU/OS based lower power" state; and, possible relationships between the pair of states.

Referring back to FIG. 9a, note that the non main CPU/OS computing system may be implemented with a controller 917 that may be, in turn, implemented as a microprocessor or micro-controller. As a consequence, embodiments are envisioned where the non main CPU/OS computing system executes its own software routines. FIG. 10 shows a diagram that demonstrates how the software of the non main CPU/OS computing system (right hand side of FIG. 10) might cooperate with software that is executed by the main CPU and OS. That is, recalling that the non main CPU/OS computing system may remain powered on and active during both the "active on" state and the "main CPU/OS based lower power" state, it is possible that a "dual system" may be implemented in which software from both systems (main CPU/OS and non main CPU/OS) operate with one another as a cooperative whole during either the "active on" state or the "main CPU/OS based lower power" state. FIG. 10 attempts to demonstrate this relationship.

FIG. 10 can be viewed as (although should be not be construed as being solely limited to) an embodiment of a system which utilizes a closed lid user interface (such as those shown in FIG. 9b) to access relevant end user data, or to control useful end user functions while the laptop/notebook computer's lid is closed. FIG. 10 shows how functions of operation are distributed between the different system states described in FIG. 3: "normal on" state 301, "main CPU/OS based" state 304 and the "non main CPU/OS based" state 305.

The right hand side of FIG. 10 shows software components of the non main CPU/OS computing system. These include non main operating system (i.e., non main OS) components such as: 1) an application programmer's interface (API) 1001; 2) a management function 1002 (which can include both event management and function management routines); 3) a data storage management function 1003 (to control the non main CPU/OS computing system's use of its distinctive data storage resources (such as FLASH or polymer memory 922 of FIG. 9a)); and, 4) a user interface management function 1004 (to control the non main CPU/OS computing system's use of its distinctive user interface (such as user interface 925 of FIG. 9a).

Application software 1005, 1006 may also reside on the non main CPU/OS computing system. Application software can typically broken down into two types: 1) data storage 1005 (which is directed to the use/management of stored data); and, 2) functional 1006 (which are directed to useful functions to be performed by the underlying controller 917).

As with typically software environments, the non main CPU/OS computing system applications 1005, 1006 interface with the non main CPU/OS computing system operating system through an API 1001.

When in the "non main CPU/OS based lower power" state, the non main CPU/OS computing system (including software components 1001 through 1006) operates independently. Also, because the main CPU/OS is inactive during the "non main CPU/OS based lower power" state, software components 1007 through 1012 that run on the main CPU/OS are likewise inactive. However, when the overall system is within the "normal active" state or the "main CPU/OS based low power state" various software components that run on the main CPU/OS are active; and, moreover, because the non main CPU/OS computing system remains active during either of these states, the software from both systems may work together as a cooperative whole.

For example, by being cognizant of certain resources that are under the control of the non main CPU/OS computing system, the main CPU/OS side software may be configured to "use" these resources. For example, software routines on the main CPU/OS computing system may be configured to utilize data storage or memory resources that are distinctive to the non main CPU/OS computing system (e.g., such as units 918, 921 and 922 of FIG. 9a). As another example, software routines on the main CPU/OS computing system may be configured to affect the status of various resources associated with a user interface that is distinctive to the non main CPU/OS computing system. For example, as explained in more detailed below, a cordless telephone answering machine that is implemented within the "main CPU/OS based low power" state (as described with respect to FIG. 5) may desire to repeatedly flash "on and off" an LED (such as LED 924 of FIG. 9a) that is associated with the non main CPU/OS based user interface (e.g., to inform a user that a message has been recorded for the user to listen to). A description of such an embodiment will be explained in more detail below with respect to FIG. 11.

In order for the main CPU/OS software 1007 through 1012 to "work with" the non main CPU/OS software 1001 through 1006, such software may send messages to the non main CPU/OS controller 917 to request certain actions or can pass data objects for storage 1003. The application software may again be broken down into data applications 1009, 1010 and functional applications 1013, 1011. However, some of these applications 1009, 1013 may be pre-written with an understanding that resources on a non-main CPU/OS computing system are available; whereas, other (e.g., older "legacy") software applications 1010, 1011 may have been written without any recognition or cognizance that such resources exist. For those software applications of the later type, "proxy" software 1007, 1008 that acts as a "glue layer" may be used to force or otherwise cause the legacy applications to be able to operate cooperatively with the non main CPU/OS system resources. Functional blocks 1002, 1003 and 1004 allow the User to interact with the User Interface 925 to display PIM and other information or to control some functions like playing MP3 files. The manager 1002 accepts data objects which are then stored in the storage block 1003. These data objects represent data to be displayed on the user interface (PIM or other data) and originate in data applications 1005, 1010 or 1009. The applications 1010 and 1007 operate in the "normal on" state 301 and are responsible for providing data objects to be stored in storage 1003 through the API 1001 via the Manager 1002. Examples of Legacy Data Applications 1010 are present versions of Outlook™ and Lotus Notes™ which contain PIM data but have no knowledge of how to create data objects that the User Interface 1004 can understand or how to move these objects to the Storage 1003. The Proxy Application 1007 is responsible for this function, and essentially pulls the appropriate date from the Legacy application, formats it into the correct data object, and then passes these data objects to the Manager 1002 via the API 1001 to be stored by the Storage 1003. In the future these types of applications will build in these exporting functions and are represented by the Data Application 1009.

Functions that will operate in the "main CPU/OS based" state 304 and are controlled by this user interface 925/1004 include applications 1011, 1008 and 1013. Again Legacy Function represents something that is unaware of the non-main CPU/OS functions, and therefore require a main CPU/OS Proxy driver to interface with these functions. An example of one such application is a legacy media player which can play music files. In this case a proxy application 1008 can be written to allow the User Interface 1004 to control this application while in the main CPU/OS based state 304. This application would allow the user to control playing of media songs stored on the subsystems available in the main CPU/OS based state 304 and then output through some audio interface. In the future these types of applications will build in these proxy functions and are represented by the Function Application 1013.

Functions that operate in the non main CPU/OS based state 305 reside on the right side of the diagram. The User Interface 1004 is responsible for reacting to user button presses (Keyboard/Buttons 920) and then displaying the data objects on the Display 919. Embedded within the data objects are navigation commands that tell the User Interface which objects to display next based on which button is pressed. Additionally the Manager will allow the user to control MP3 playback through an MP3 non main CPU/OS based lower power state Function Apps 1006; which is responsible for getting the MP3 file from storage 1003, decoding the file and sending the output through a Bluetooth interface to a wireless headset.

An example of a data storage application 1005 is an application that connects back to an enterprise server to retrieve new PIM data objects which can then be put in Storage 1003 for access by the user through the User Interface 1004. In this case the application 1005 would access these new data objects through a wireless communication device operating in the non main CPU/OS based state 305 (such as the WLAN 911 or WWAN 913)

Figure 11:
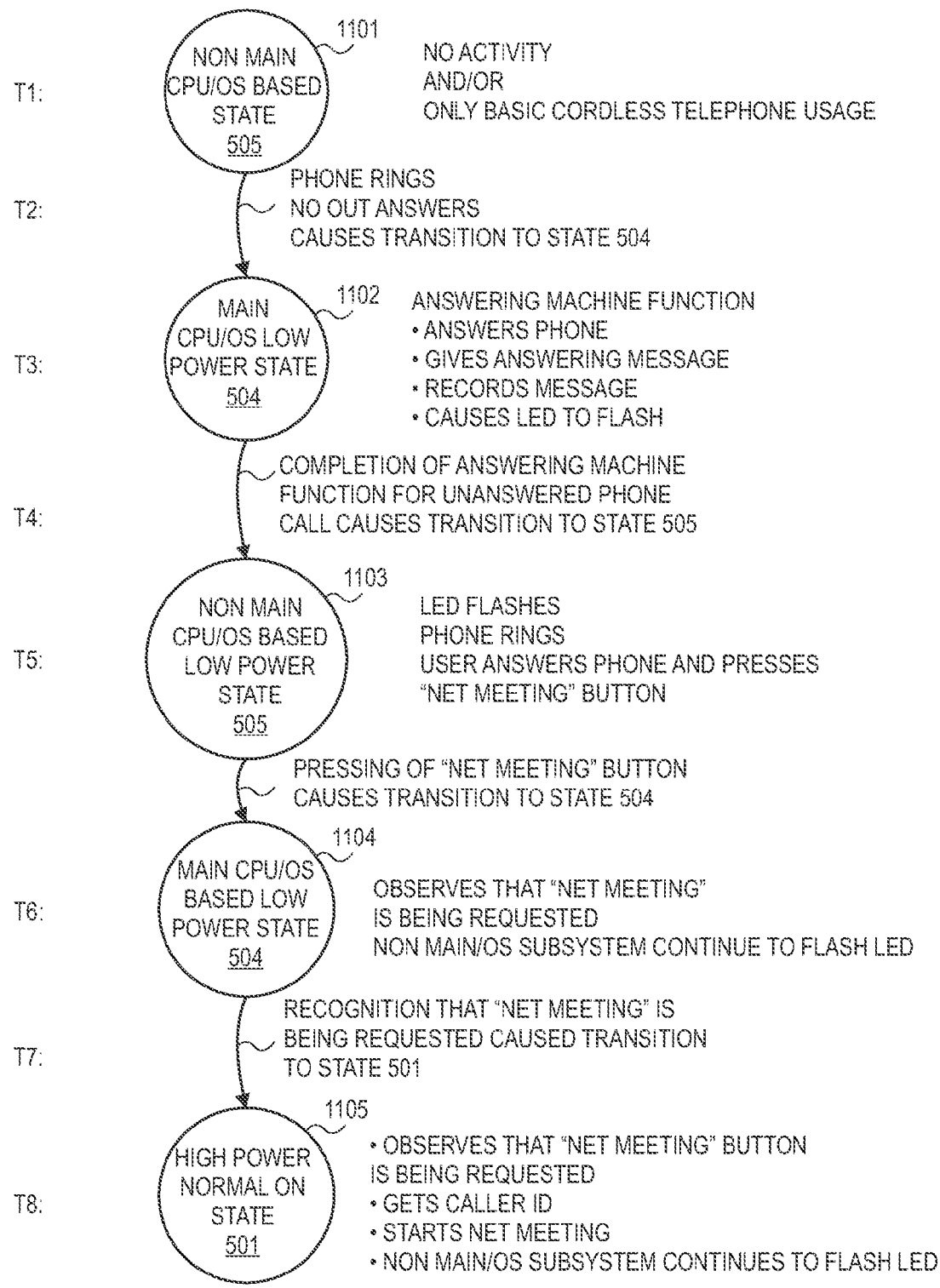
FIG. 11 illustrates an example of a number of state transitions that react to the use of a computing system over time.

FIG. 11 shows another embodiment of the state transitions that may arise over the course of operation of complete cordless telephone system as described with respect to FIG. 5. However, the example of FIG. 11 is slightly more elaborate than the discussion of FIG. 5 in that both an LED is flashed (to indicate to a user that a message from an unanswered phone call has been recorded and is waiting for the user) and a net meeting is established. According to the approach of FIG. 11, over a time period T1, the system is originally within the "non main CPU/OS based lower power" state 505, 1101 where no activity/use of the computer arises other than that of a basic cordless telephone.

At point in time T2 a call is made into the cordless telephone and no one answers. As a consequence a transition into the "main CPU/OS based low power state" 504, 1102 is caused to realize the answering machine function. Over a time period T3, the answering machine function answers the phone, plays a message to the caller, records the callers message and causes an LED to repeatedly flash on the user interface that is distinctive to the non main CPU/OS computing system (e.g., LED 924 of FIG. 9*a*). Note that the later function of causing the LED to flash corresponds to a cooperative workflow between answering machine software that resides on the main CPU/OS; and LED software/hardware that is distinctive to the non main CPU/OS computing system.

Upon completion of the above functions, at time T4, the overall computing system transitions back into the "non main CPU/OS based lower power" state 505, 1103. At time T5, with the LED continuing to flash (i.e., it does not stop flashing until the user listens to the recorded message), the phone again rings. However, this time, the user answers the phone and recognizes that the present call is in regard to a net meeting that needs to be established. The user presses a "net meeting" button found on the non main CPU/OS computing system user interface (e.g., associated with keyboards/buttons 920 of FIG. 9*a*).

The pressing of the "net meeting" button causes a first transition into the "main CPU/OS based lower power" state 505, 1104 and a second transition into the "normal on" state 501, 1105. In the "normal on" state, the caller ID of the incoming phone call and the resources of the main CPU/OS are utilized to establish a net meeting and perform work there under (e.g., by modifying a common document with another individual over the internet). The LED continues to flash under the control of the non main CPU/OS computing system because the user has still not listened to the recorded message.

It is also to be understood that because embodiments of the present teachings may be implemented as one or more software programs, embodiments of the present teachings may be implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. At least one non-transitory machine-readable medium comprising one or more instructions which, if executed by a computing system, causes the computing system to:
save an operating environment of the computing system;
set a power consumption state for the computing system via logic including a bit that is to be set when the computing system is to transition to a relatively lower power operation state, wherein the bit is to indicate that the power consumption state specific to the relatively lower power operation state is to be engaged to disable at least a main processor to place the main processor in an inactive state when the computing system is to enter the relatively lower power operation state and wherein system memory of the computing system is to be inactive in the relatively lower power operation state; and
execute a function from the relatively lower power operation state, wherein at least one component of the computing system is to remain active to implement the relatively lower power operation state.

2. The medium of claim 1, wherein the operating environment is to include one or more of a state of a routine and data of a routine.

3. The medium of claim 1, wherein one or more of another processor and a main system bus of the computing system is to remain active to implement the relatively lower power operation state.

4. The medium of claim 1, wherein the instructions, if executed, further cause the computing system to:
transition out of the relatively lower power operation state; and
activate the main processor.

5. The medium of claim 1, wherein the instructions, if executed, further cause the computing system to:
record that the main processor is to be placed in the inactive state due to the computing system entering the relatively lower power consumption state by a write to the bit; and
recognize that the computing system is to transition from the relatively lower power operation state and not from a non operational sleep state by a read from the bit.

6. The medium of claim 1, wherein the instructions, if executed, further cause the computing system to selectively activate a component of the computing system specific to a usage of the computing system.

7. The medium of claim 1, wherein the instructions, if executed, further cause the computing system to transition out of the relatively lower power operation state in response to a need to use a function that is not operable within the relatively lower power operation state.

8. The medium of claim 1, wherein the instructions, if executed, further cause the computing system to enter a relatively higher power operation state, wherein the relatively higher power operation state is to include at least one inactive component.

9. The medium of claim 1, wherein the instructions, if executed, further cause the computing system to restore the saved operating environment.

10. The medium of claim 1, wherein the instructions, if executed, further cause the computing system to remove power to the main processor to disable the main processor.

11. The medium of claim 1, wherein the instructions, if executed, further cause the computing system to logically disable one or more of the main processor and a component of the computing system.

12. A method comprising:
saving an operating environment of a computing system;
setting a power consumption state for the computing system via logic including a bit that is set when the computing system transitions to a relatively lower power operation state, wherein the bit indicates that the power consumption state specific to the relatively lower power operation state is engaged to disable at least a main processor to place the main processor in an inactive state when the computing system enters the relatively lower power operation state and wherein system memory of the computing system is to be inactive in the relatively lower power operation state; and
executing a function from the relatively lower power operation state, wherein at least one component of the computing system remains active to implement the relatively lower power operation state.

13. The method of claim 12, further including:
transitioning out of the relatively lower power operation state; and
activating the main processor.

14. The method of claim 12, further including:
recording that the main processor is placed in the inactive state due to the computing system entering the relatively lower power consumption state by writing to the bit; and
recognizing that the computing system transitions from the relatively lower power operation state and not from a non operational sleep state by reading from the bit.

15. The method of claim 12, further including:
selectively activating a component of the computing system specific to a usage of the computing system; and
transitioning out of the relatively lower power operation state in response to a need to use a function that is not operable within the relatively lower power operation state.

16. The method of claim 12, further including:
entering a relatively higher power operation state, wherein the relatively higher power operation state includes at least one inactive component; and
restoring the saved operating environment.

17. The method of claim 12, further including:
removing power to the main processor to disable the main processor; and
logically disabling a component of the computing system.

18. An apparatus comprising:
logic including a bit that is to be set when the apparatus is to transition to a relatively lower power operation state, wherein the bit is to indicate that a power consumption state specific to the relatively lower power operation state is to be engaged to disable at least a main processor to place the main processor in an inactive state when the apparatus is to enter the relatively lower power operation state and wherein system memory of the computing system is to be inactive in the relatively lower power operation state; and
at least one component that is to remain active to implement the relatively lower power operation state.

19. The apparatus of claim 18, wherein:
the bit is to be written to for a record that the main processor is to be placed in the inactive state due to the computing system entering the relatively lower power consumption state; and
the bit is to be read to recognize that the apparatus is to transition from the relatively lower power operation state and not from a non operational sleep state.

* * * * *